US012192625B2

(12) United States Patent
Kalkgruber et al.

(10) Patent No.: US 12,192,625 B2
(45) Date of Patent: *Jan. 7, 2025

(54) DIRECT SCALE LEVEL SELECTION FOR MULTILEVEL FEATURE TRACKING UNDER MOTION BLUR

(71) Applicant: Snap Inc., Santa Monica, CA (US)

(72) Inventors: Matthias Kalkgruber, Vienna (AT); Daniel Wolf, Mödling (AT)

(73) Assignee: SNAP INC., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/321,565

(22) Filed: May 22, 2023

(65) Prior Publication Data

US 2023/0300464 A1 Sep. 21, 2023

Related U.S. Application Data

(63) Continuation of application No. 17/521,109, filed on Nov. 8, 2021, now Pat. No. 11,683,585.
(Continued)

(51) Int. Cl.
*H04N 23/68* (2023.01)
*G06T 3/40* (2024.01)
(Continued)

(52) U.S. Cl.
CPC ............ *H04N 23/6811* (2023.01); *G06T 3/40* (2013.01); *G06T 5/70* (2024.01); *G06T 7/20* (2013.01);
(Continued)

(58) Field of Classification Search
CPC ........... H04N 23/6811; H04N 23/6812; H04N 23/683; G06T 3/40; G06T 5/70;
(Continued)

(56) References Cited

U.S. PATENT DOCUMENTS 11,683,585 B2 6/2023 Kalkgruber et al.
11,765,457 B2 9/2023 Ding et al.
(Continued)

FOREIGN PATENT DOCUMENTS

CN 117321635 12/2023
CN 117337575 1/2024
(Continued)

OTHER PUBLICATIONS

"International Application Serial No. PCT US2022 029629, International Preliminary Report on Patentability mailed Nov. 30, 2023", 9 pgs.

(Continued)

*Primary Examiner* — Padma Haliyur
(74) *Attorney, Agent, or Firm* — SCHWEGMAN LUNDBERG & WOESNER, P.A.

(57) ABSTRACT

A method for mitigating motion blur in a visual-inertial tracking system is described. In one aspect, the method includes accessing a first image generated by an optical sensor of the visual tracking system, accessing a second image generated by the optical sensor of the visual tracking system, the second image following the first image, determining a first motion blur level of the first image, determining a second motion blur level of the second image, identifying a scale change between the first image and the second image, determining a first optimal scale level for the first image based on the first motion blur level and the scale change, and determining a second optimal scale level for the second image based on the second motion blur level and the scale change.

20 Claims, 17 Drawing Sheets

Related U.S. Application Data

(60) Provisional application No. 63/190,101, filed on May 18, 2021.

(51) Int. Cl.
*G06T 5/70* (2024.01)
*G06T 7/20* (2017.01)
*G06V 10/44* (2022.01)

(52) U.S. Cl.
CPC ....... *G06V 10/443* (2022.01); *H04N 23/6812* (2023.01)

(58) Field of Classification Search
CPC ... G06T 7/20; G06T 7/73; G06T 2207/10016; G06T 2207/20016; G06T 2207/20201; G06V 10/443
See application file for complete search history.

(56) References Cited

U.S. PATENT DOCUMENTS

| | | | |
|---|---|---|---|
| 2010/0119171 | A1 | 5/2010 | Gobert |
| 2010/0208944 | A1* | 8/2010 | Fukunishi ............ H04N 23/683 382/107 |
| 2011/0193990 | A1 | 8/2011 | Pilman et al. |
| 2012/0314093 | A1 | 12/2012 | Tamayama et al. |
| 2014/0037137 | A1 | 2/2014 | Broaddus et al. |
| 2014/0363096 | A1 | 12/2014 | Zhou et al. |
| 2015/0187133 | A1 | 7/2015 | Martini |
| 2016/0173749 | A1 | 6/2016 | Dallas et al. |
| 2019/0122378 | A1 | 4/2019 | Aswin |
| 2020/0374455 | A1 | 11/2020 | Ilic et al. |
| 2020/0389583 | A1 | 12/2020 | Levy et al. |
| 2021/0026366 | A1 | 1/2021 | Horesh |
| 2021/0110615 | A1 | 4/2021 | Zhao et al. |
| 2021/0114748 | A1 | 4/2021 | Takahashi et al. |
| 2022/0028094 | A1 | 1/2022 | Bleyer et al. |
| 2022/0245832 | A1 | 8/2022 | Gupte et al. |
| 2022/0375041 | A1 | 11/2022 | Borys et al. |
| 2022/0377238 | A1 | 11/2022 | Kalkgruber et al. |
| 2022/0377239 | A1 | 11/2022 | Ding et al. |
| 2023/0308758 | A1* | 9/2023 | Karpushin .............. G06T 7/246 |
| 2023/0388632 | A1 | 11/2023 | Ding et al. |

FOREIGN PATENT DOCUMENTS

| | | |
|---|---|---|
| CN | 117441343 | 1/2024 |
| KR | 20130124837 | 11/2013 |
| WO | 2022245648 | 11/2022 |
| WO | 2022245821 | 11/2022 |
| WO | 2022246383 | 11/2022 |

OTHER PUBLICATIONS

"International Application Serial No. PCT US2022 072340, International Preliminary Report on Patentability mailed Nov. 30, 2023", 14 pgs.

"International Application Serial No. PCT US2022 029182, International Preliminary Report on Patentability mailed Nov. 30, 2023", 7 pgs.

"U.S. Appl. No. 17/521,081, Non Final Office Action mailed Dec. 7, 2023", 14 pgs.

"International Application Serial No. PCT US2022 029182, International Search Report mailed Aug. 30, 2022", 5 pgs.

"International Application Serial No. PCT US2022 029182, Written Opinion mailed Aug. 30, 2022", 5 pgs.

"International Application Serial No. PCT US2022 029629, International Search Report mailed Sep. 1, 2022", 4 pgs.

"International Application Serial No. PCT US2022 029629, Written Opinion mailed Sep. 1, 2022", 7 pgs.

"International Application Serial No. PCT US2022 072340, International Search Report mailed Sep. 30, 2022", 5 pgs.

"International Application Serial No. PCT US2022 072340, Written Opinion mailed Sep. 30, 2022", 12 pgs.

"U.S. Appl. No. 17/522,642, Non Final Office Action mailed Oct. 14, 2022", 10 pgs.

"U.S. Appl. No. 17/521,109, Non Final Office Action mailed Dec. 1, 2022", 12 pgs.

"U.S. Appl. No. 17/522,642, Response filed Jan. 12, 2023 to Non Final Office Action mailed Oct. 14, 2022", 11 pgs.

"U.S. Appl. No. 17/521,109, Response filed Jan. 16, 2023 to Non Final Office Action mailed Dec. 1, 2022", 12 pgs.

"U.S. Appl. No. 17/521,109, Notice of Allowance mailed Feb. 8, 2023", 9 pgs.

"U.S. Appl. No. 17/522,642, Notice of Allowance malled May 5, 2023", 8 pgs.

Bretzner, L., "Feature Tracking with Automatic Selection of Spatial Scales", Computer Vision and Image Understanding, Academic Press, US, vol. 71, No. 3, (Sep. 1, 1998), 385-392.

Jurik, Martin, "Trade-off Between Resolution and Frame Rate for Visual Tracking of Mini-robots on Planar Surfaces", International Conference on Manipulation, Automation and Robotics at Small Scales (MARSS), IEEE, (Jul. 1, 2019), 1-6.

"U.S. Appl. No. 17/521,081, Response filed Mar. 6, 2024 to Non Final Office Action mailed Dec. 7, 2023", 11 pgs.

"U.S. Appl. No. 17/521,081, Final Office Action mailed Apr. 5, 2024", 16 pgs.

"U.S. Appl. No. 17/521,081, Response filed May 29, 2024 to Final Office Action mailed Apr. 5, 2024", 11 pgs.

"U.S. Appl. No. 17/521,081, Advisory Action mailed Jun. 7, 2024", 4 pgs.

"U.S. Appl. No. 17/521,081, Notice of Allowance mailed Jul. 17, 2024", 7 pgs.

* cited by examiner

We want to find matching levels for Src and Tgt: $L_{Src}$, $L_{Tgt}$

1. Compute best level for blur in Src and Tgt: $B_{Src}$, $B_{Tgt}$
2. The max of both is the base matching level for blur: $B = \max(B_{Src}, B_{Tgt})$
3. Compute the relative scale change from Src to Tgt as level delta $\Delta_{Src \to Tgt}$
4. If $\Delta_{Src \to Tgt} > 0$: (this means matching level for Tgt should be higher (lower res) than for Src)
   $$L_{Src} = \max(B_{Src}, B - \Delta_{Src \to Tgt})$$
   $$L_{Tgt} = L_{Src} + \Delta_{Src \to Tgt}$$

If $\Delta_{Src \to Tgt} < 0$: (this means matching level for Src should be higher (lower res) than for Tgt)
   $$L_{Tgt} = \max(B_{Tgt}, B + \Delta_{Src \to Tgt})$$
   $$L_{Src} = L_{Tgt} - \Delta_{Src \to Tgt}$$

FIG. 14

DIRECT SCALE LEVEL SELECTION FOR MULTILEVEL FEATURE TRACKING UNDER MOTION BLUR

RELATED APPLICATIONS

The present application is a continuation of U.S. patent application Ser. No. 17/521,109, filed Nov. 8, 2021, which claims priority to U.S. Provisional Patent Application Ser. No. 63/190,101, filed May 18, 2021, each of which is hereby incorporated by reference in its entirety.

TECHNICAL FIELD

The subject matter disclosed herein generally relates to a visual tracking system. Specifically, the present disclosure addresses systems and methods for mitigating motion blur in visual-inertial tracking systems.

BACKGROUND

An augmented reality (AR) device enables a user to observe a scene while simultaneously seeing relevant virtual content that may be aligned to items, images, objects, or environments in the field of view of the device. A virtual reality (VR) device provides a more immersive experience than an AR device. The VR device blocks out the field of view of the user with virtual content that is displayed based on a position and orientation of the VR device.

Both AR and VR devices rely on motion tracking systems that track a pose (e.g., orientation, position, location) of the device. A motion tracking system (also referred to as visual tracking system) uses images captured by an optical sensor of the AR/VR device to track its pose. However, the images can be blurry when the AR/VR device moves fast. As such, high motion blur results in degraded tracking performance. Alternatively, high motion blur results in higher computational operations to maintain adequate tracking accuracy and image quality under high dynamics.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 14 illustrates an example of an algorithm for motion blur mitigation in accordance with one embodiment.

DETAILED DESCRIPTION

Figure 1:
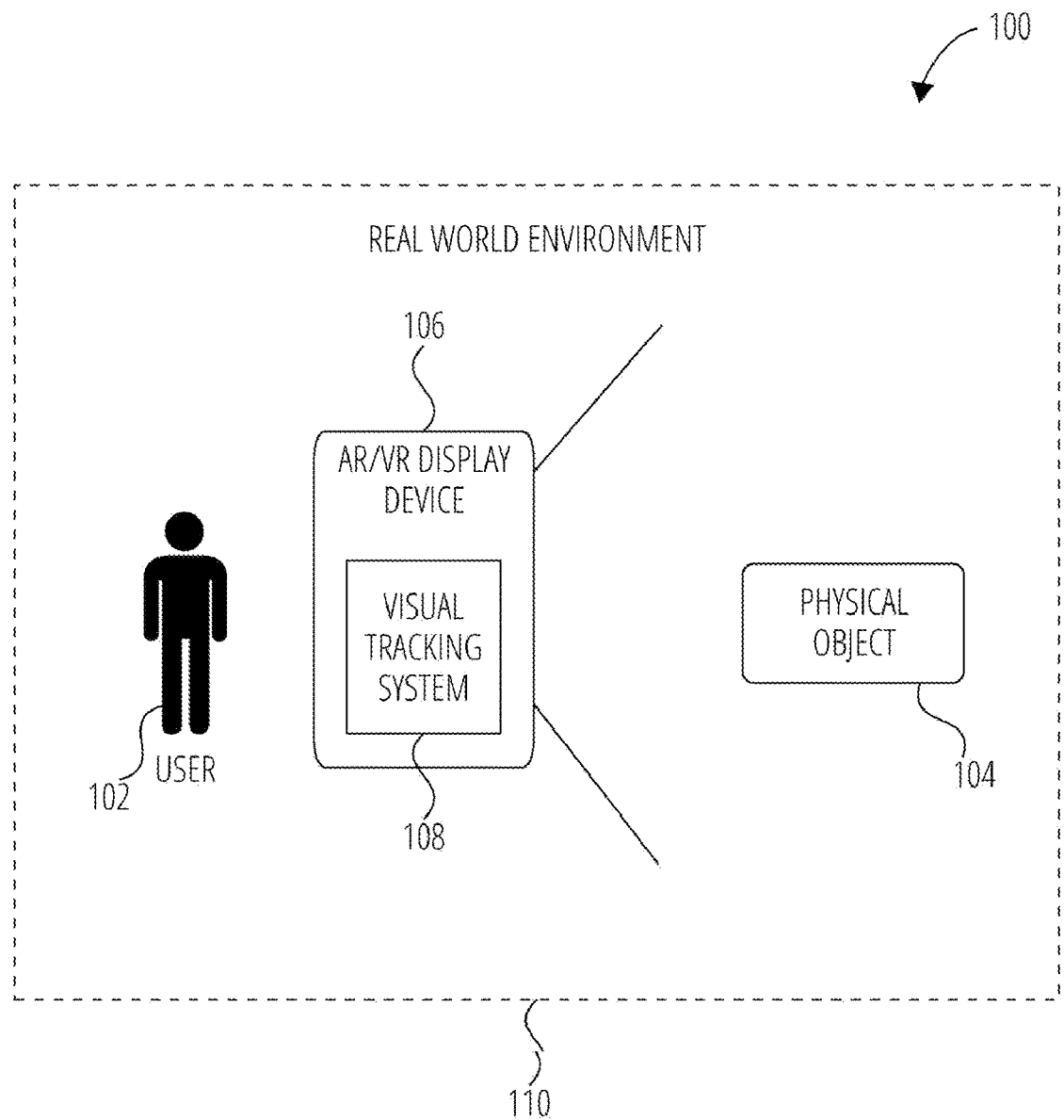
FIG. 1 is a block diagram illustrating an environment for operating an AR/VR display device in accordance with one example embodiment.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural Components, such as modules) are optional and may be combined or subdivided, and operations (e.g., in a procedure, algorithm, or other function) may vary in sequence or be combined or subdivided.

The term "augmented reality" (AR) is used herein to refer to an interactive experience of a real-world environment where physical objects that reside in the real-world are "augmented" or enhanced by computer-generated digital content (also referred to as virtual content or synthetic content). AR can also refer to a system that enables a combination of real and virtual worlds, real-time interaction, and 3D registration of virtual and real objects. A user of an AR system perceives virtual content that appears to be attached or interact with a real-world physical object.

The term "virtual reality" (VR) is used herein to refer to a simulation experience of a virtual world environment that is completely distinct from the real-world environment. Computer-generated digital content is displayed in the virtual world environment. VR also refers to a system that enables a user of a VR system to be completely immersed in the virtual world environment and to interact with virtual objects presented in the virtual world environment.

The term "AR application" is used herein to refer to a computer-operated application that enables an AR experience. The term "VR application" is used herein to refer to a computer-operated application that enables a VR experience. The term "AR/VR application" refers to a computer-operated application that enables a combination of an AR experience or a VR experience.

The term "visual tracking system" is used herein to refer to a computer-operated application or system that enables a system to track visual features identified in images captured by one or more cameras of the visual tracking system. The visual tracking system builds a model of a real-world environment based on the tracked visual features. Non-limiting examples of the visual tracking system include: a visual Simultaneous Localization and Mapping system (VSLAM), and Visual Odometry Inertial (VIO) system. VSLAM can be used to build a target from an environment, or a scene based on one or more cameras of the visual tracking system. VIO (also referred to as a visual-inertial tracking system, and visual-inertial odometry system) determines a latest pose (e.g., position and orientation) of a device based on data acquired from multiple sensors (e.g., optical sensors, inertial sensors) of the device.

The term "Inertial Measurement Unit" (IMU) is used herein to refer to a device that can report on the inertial status of a moving body including the acceleration, velocity, orientation, and position of the moving body. An IMU enables tracking of movement of a body by integrating the acceleration and the angular velocity measured by the IMU. IMU can also refer to a combination of accelerometers and gyroscopes that can determine and quantify linear acceleration and angular velocity, respectively. The values obtained from the IMUs gyroscopes can be processed to obtain the pitch, roll, and heading of the IMU and, therefore, of the body with which the IMU is associated. Signals from the IMU's accelerometers also can be processed to obtain velocity and displacement of the IMU.

Both AR and VR applications allow a user to access information, such as in the form of virtual content rendered in a display of an AR/VR display device (also referred to as a display device). The rendering of the virtual content may be based on a position of the display device relative to a physical object or relative to a frame of reference (external to the display device) so that the virtual content correctly appears in the display. For AR, the virtual content appears aligned with a physical object as perceived by the user and a camera of the AR display device. The virtual content appears to be attached to the physical world (e.g., a physical object of interest). To do this, the AR display device detects the physical object and tracks a pose of the AR display device relative to the position of the physical object. A pose identifies a position and orientation of the display device relative to a frame of reference or relative to another object. For VR, the virtual object appears at a location based on the pose of the VR display device. The virtual content is therefore refreshed based on the latest pose of the device. A visual tracking system at the display device determines the pose of the display device. An example of a visual tracking system includes a visual-inertial tracking system (e.g., VIO system) that relies on data acquired from multiple sensors (e.g., optical sensors, inertial sensors).

Images captured by the visual tracking system can be blurry when the camera moves fast (e.g., rotates fast). The motion blur in the images can result in degraded tracking performance (of the visual tracking system). Alternatively, motion blur can also result in higher computational operations of the visual tracking system in order to maintain adequate tracking accuracy and image quality under high dynamics.

In particular, visual tracking systems are usually based on an image feature matching component. In the incoming video stream, an algorithm detects distinct 3D points in an image (features) and tries to re-find (match) these points in subsequent images. A first image in this matching procedure is herein referred to as a "source image." A second image (e.g., a subsequent image in which features are to be matched) is herein referred to as a "target image."

Reliable feature points are usually detected in high-contrast areas of an image (e.g., corners or edges). However, for head-worn devices with built-in cameras, the cameras might be moved rapidly as the user shakes his/her head, causing severe motion blur in the images captured with the built-in cameras. Such rapid motion results in blurred high contrast areas. As a result, the feature detection and matching stage of the visual tracking system is negatively affected, and the overall tracking accuracy of the system suffers.

A common strategy to mitigate motion blur is to perform the feature detection and matching on downsampled versions of the source and target image, if matching on the original image resolution fails due to motion blur. While visual information is lost in the downsampled image version, the motion blur is reduced. Thus, feature matching becomes more reliable. Often, images are downsampled multiple times to obtain different resolutions for different severities of motion blur, and the set of all different versions is referred to as an image pyramid. The downscaling process is also referred to as "image pyramid process" or "image pyramid algorithm." However, the image pyramid process can be time-consuming, and the process is computation-intensive.

The typical image pyramid algorithm performs an iterative downscaling process on multiple levels of the source image and the target image until features from a downscaled level of the source image and the downscaled level of the target image are matched. For example, in a fine to coarse process, the image pyramid algorithm starts with the finest level (highest image resolution) and continues until a successful match. In a coarse to fine process, the image pyramid algorithm starts with the coarsest level (lowest image resolution) and stops when the matching fails. In either cases, the image pyramid algorithm performs matching on many multiple levels.

The present application describes a method for identifying an optimal scale level for feature matching. Instead of attempting to match features on every scale level of the image pyramid algorithm until a successful match is detected, the presently described method predicts the optimal scale level for feature matching ahead of the matching process based on multiple inputs (e.g., motion blur estimations and predicted scale changes). As such, for each feature, only one matching attempt is required per image, resulting in shorter processing time.

In one example embodiment, the present application describes a method for mitigating motion blur in a visual-inertial tracking system. The method includes accessing a first image generated by an optical sensor of the visual tracking system, accessing a second image generated by the optical sensor of the visual tracking system, the second image following the first image, determining a first motion blur level of the first image, determining a second motion blur level of the second image, identifying a scale change between the first image and the second image, determining a first optimal scale level for the first image based on the first motion blur level and the scale change, and determining a second optimal scale level for the second image based on the second motion blur level and the scale change.

As a result, one or more of the methodologies described herein facilitate solving the technical problem of power consumption saving by identifying an optimal scale level for an image pyramid process to a current image. The presently described method provides an improvement to an operation of the functioning of a computer by providing power consumption reduction while still maintaining robustness of the visual-inertial tracking against motion blur. As such, one or more of the methodologies described herein may obviate a need for certain efforts or computing resources. Examples of such computing resources include processor cycles, network traffic, memory usage, data storage capacity, power consumption, network bandwidth, and cooling capacity.

FIG. 1 is a network diagram illustrating an environment 100 suitable for operating an AR/VR display device 106, according to some example embodiments. The environment 100 includes a user 102, an AR/VR display device 106, and a physical object 104. A user 102 operates the AR/VR display device 106. The user 102 may be a human user (e.g., a human being), a machine user (e.g., a computer configured by a software program to interact with the AR/VR display device 106), or any suitable combination thereof (e.g., a human assisted by a machine or a machine supervised by a human). The user 102 is associated with the AR/VR display device 106.

The AR/VR display device 106 may be a computing device with a display such as a smartphone, a tablet computer, or a wearable computing device (e.g., watch or glasses). The computing device may be hand-held or may be removable mounted to a head of the user 102. In one example, the display includes a screen that displays images captured with a camera of the AR/VR display device 106. In another example, the display of the device may be transparent such as in lenses of wearable computing glasses. In other examples, the display may be non-transparent, partially transparent, partially opaque. In yet other examples, the display may be wearable by the user 102 to cover the field of vision of the user 102.

The AR/VR display device 106 includes an AR application generates virtual content based on images detected with the camera of the AR/VR display device 106. For example, the user 102 may point a camera of the AR/VR display device 106 to capture an image of the physical object 104. The AR application generates virtual content corresponding to an identified object (e.g., physical object 104) in the image and presents the virtual content in a display of the AR/VR display device 106.

The AR/VR display device 106 includes a visual tracking system 108. The visual tracking system 108 tracks the pose (e.g., position and orientation) of the AR/VR display device 106 relative to the real world environment 110 using, for example, optical sensors (e.g., depth-enabled 3D camera, image camera), inertia sensors (e.g., gyroscope, accelerometer), wireless sensors (Bluetooth, Wi-Fi), GPS sensor, and audio sensor. In one example, the AR/VR display device 106 displays virtual content based on the pose of the AR/VR display device 106 relative to the real world environment 110 and/or the physical object 104.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 6 to FIG. 7. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The AR/VR display device 106 may operate over a computer network. The computer network may be any network that enables communication between or among machines, databases, and devices. Accordingly, the computer network may be a wired network, a wireless network (e.g., a mobile or cellular network), or any suitable combination thereof. The computer network may include one or more portions that constitute a private network, a public network (e.g., the Internet), or any suitable combination thereof.

Figure 2:
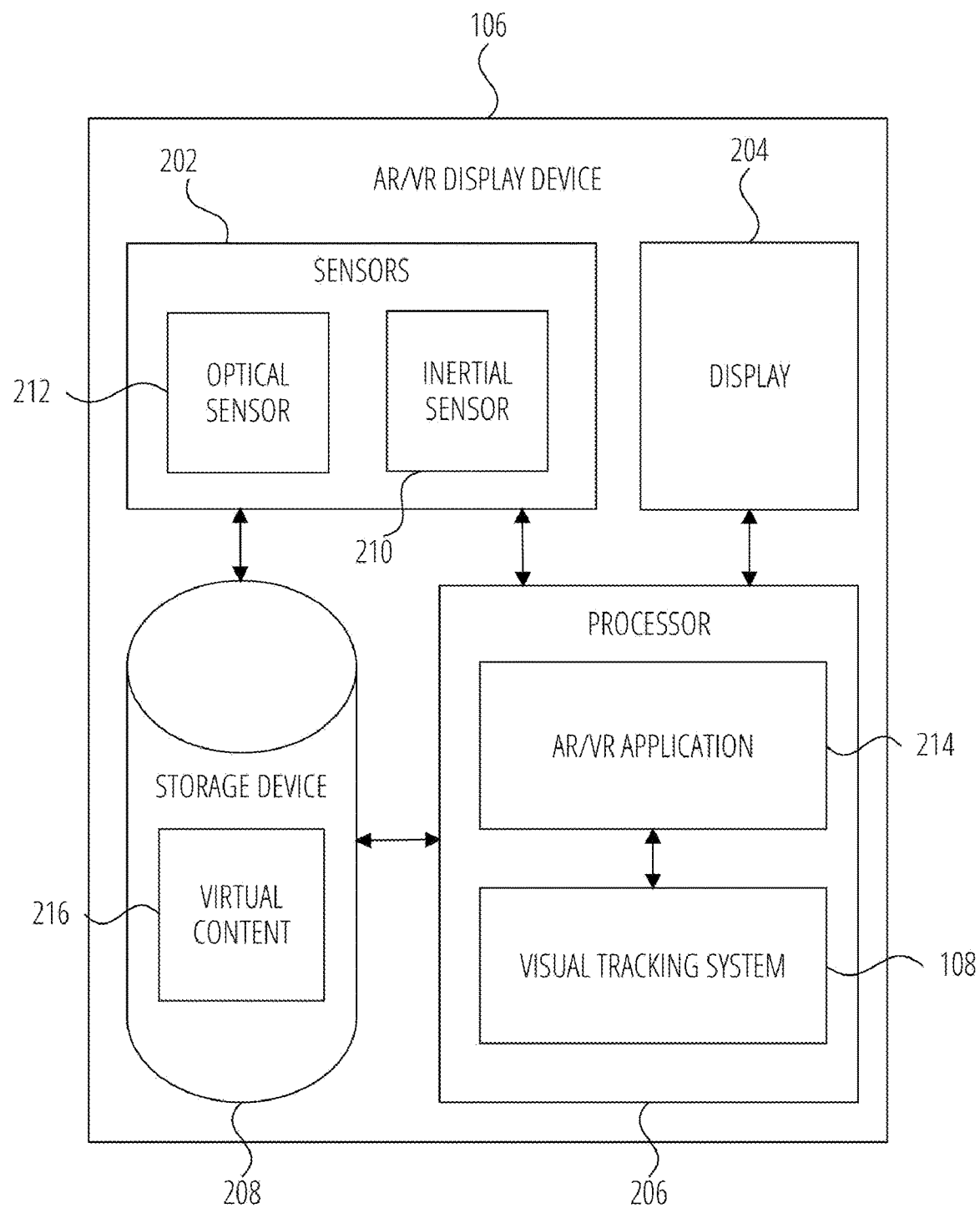
FIG. 2 is a block diagram illustrating an AR/VR display device in accordance with one example embodiment.

FIG. 2 is a block diagram illustrating modules (e.g., components) of the AR/VR display device 106, according to some example embodiments. The AR/VR display device 106 includes sensors 202, a display 204, a processor 206, and a storage device 208. Examples of AR/VR display device 106 include a wearable computing device, a mobile computing device, a navigational device, a portable media device, or a smart phone.

The sensors 202 include, for example, an optical sensor 212 (e.g., camera such as a color camera, a thermal camera, a depth sensor and one or multiple grayscale, global/rolling shutter tracking cameras) and an inertial sensor 210 (e.g., gyroscope, accelerometer, magnetometer). Other examples of sensors 202 include a proximity or location sensor (e.g., near field communication, GPS, Bluetooth, Wifi), an audio sensor (e.g., a microphone), a thermal sensor, a pressure sensor (e.g., barometer), or any suitable combination thereof. It is noted that the sensors 202 described herein are for illustration purposes and the sensors 202 are thus not limited to the ones described above.

The display 204 includes a screen or monitor configured to display images generated by the processor 206. In one example embodiment, the display 204 may be transparent or semi-opaque so that the user 102 can see through the display 204 (in AR use case). In another example embodiment, the display 204 covers the eyes of the user 102 and blocks out the entire field of view of the user 102 (in VR use case). In another example, the display 204 includes a touchscreen display configured to receive a user input via a contact on the touchscreen display.

The processor 206 includes an AR/VR application 214 and a visual tracking system 108. The AR/VR application 214 detects and identifies a physical environment or the physical object 104 using computer vision. The AR/VR application 214 retrieves virtual content (e.g., 3D object model) based on the identified physical object 104 or physical environment. The AR/VR application 214 renders the virtual object in the display 204. In one example embodiment, the AR/VR application 214 includes a local rendering engine that generates a visualization of virtual content overlaid (e.g., superimposed upon, or otherwise displayed in tandem with) on an image of the physical object 104 captured by the optical sensor 212. A visualization of the virtual content may be manipulated by adjusting a position of the physical object 104 (e.g., its physical location, orientation, or both) relative to the AR/VR display device 106. Similarly, the visualization of the virtual content may be manipulated by adjusting a pose of the AR/VR display device 106 relative to the physical object 104. For a VR application, the AR/VR application 214 displays the virtual content in the display 204 at a location (in the display 204) determined based on a pose of the AR/VR display device 106.

The visual tracking system 108 estimates a pose of the AR/VR display device 106. For example, the visual tracking system 108 uses image data and corresponding inertial data from the optical sensor 212 and the inertial sensor 210 to track a location and pose of the AR/VR display device 106 relative to a frame of reference (e.g., real world environment 110). The visual tracking system 108 is described in more detail below with respect to FIG. 3.

The storage device 208 stores virtual content 216. The virtual content 216 includes, for example, a database of visual references (e.g., images of physical objects) and corresponding experiences (e.g., three-dimensional virtual object models).

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
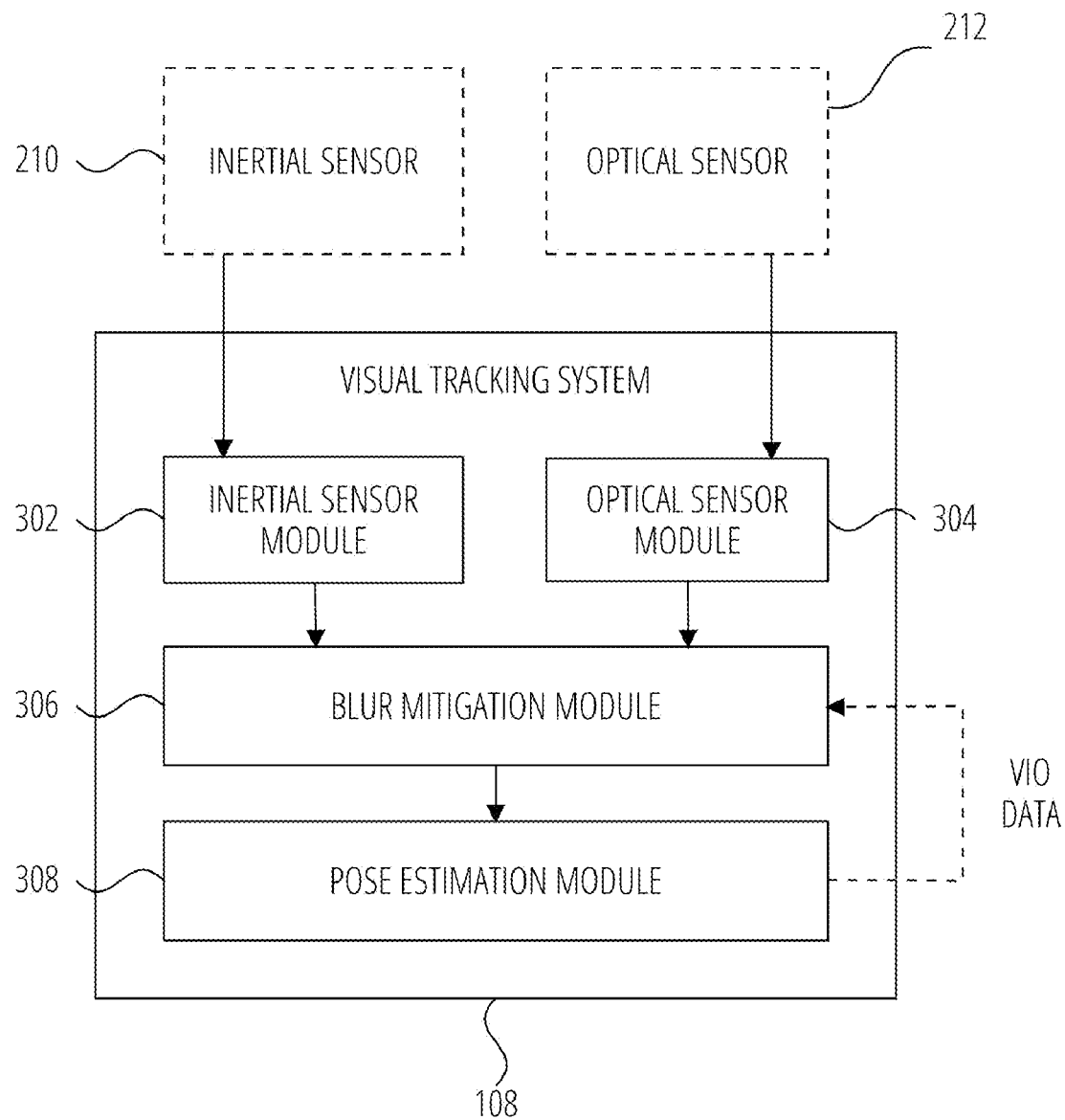
FIG. 3 is a block diagram illustrating a visual tracking system in accordance with one example embodiment.

FIG. 3 illustrates the visual tracking system 108 in accordance with one example embodiment. The visual tracking system 108 includes an inertial sensor module 302, an optical sensor module 304, a blur mitigation module 306, and a pose estimation module 308. The inertial sensor module 302 accesses inertial sensor data from the inertial sensor 210. The optical sensor module 304 accesses optical sensor data (e.g., image, camera settings/operating parameters) from the optical sensor 212. Examples of camera operating parameters include, but are not limited to, exposure time of the optical sensor 212, a field of view of the optical sensor 212, an ISO value of the optical sensor 212, and an image resolution of the optical sensor 212.

In one example embodiment, the blur mitigation module 306 determines an angular velocity of the optical sensor 212 based on IMU sensor data from the inertial sensor 210. The blur mitigation module 306 estimates a motion blur level based on the angular velocity and the camera operating parameters without performing any analysis of the pixels in the images.

In another example embodiment, the blur mitigation module 306 considers both the angular and the linear velocity of the optical sensor 212 based on current velocity estimates from the visual tracking system 108, combined with the 3D locations of the currently tracked points in the current image. For example, the blur mitigation module 306 determines the linear velocity of the optical sensor 212 and the impact of the linear velocity on different areas of the current image based on the distance of objects (from the optical sensor 212) in the current image (e.g., as determined by the 3D locations of the feature points). As such, objects that are closer to the optical sensor 212 appears more blurry than objects that are further away from the optical sensor 212 (when the optical sensor 212 is moving).

The blur mitigation module 306 downscales an image captured by the optical sensor 212 based on the motion blur level of the image. For example, the blur mitigation module 306 determines that a current image is blurry and applies an image pyramid algorithm to the current image to increase contrast. In one example embodiment, the blur mitigation module 306 identifies an optimal scale level for feature matching. Instead of attempting to match features on every scale level of the image pyramid algorithm until a successful match is detected, the blur mitigation module 306 predicts the optimal scale level for feature matching ahead of the matching process based on motion blur estimations and predicted scale changes. The higher the estimated motion blur, the lower the optimal resolution for feature matching. The higher the scale change between the source image and the target image, the more adjustment to the optimal scale level of the image pyramid algorithm. By predicting the optimal scale level for the source image and for the target image, the blur mitigation module 306 performs only one feature matching attempt per image, resulting in shorter processing time. Example components of the blur mitigation module 306 are described in more detail below with respect to FIG. 4.

The pose estimation module 308 determines a pose (e.g., location, position, orientation) of the AR/VR display device 106 relative to a frame of reference (e.g., real world environment 110). In one example embodiment, the pose estimation module 308 includes a VIO system that estimates the pose of the AR/VR display device 106 based on 3D maps of feature points from current images captured with the optical sensor 212 and the inertial sensor data captured with the inertial sensor 210.

In one example embodiment, the pose estimation module 308 computes the position and orientation of the AR/VR display device 106. The AR/VR display device 106 includes one or more optical sensor 212 mounted on a rigid platform (a frame of the AR/VR display device 106) with one or more inertial sensor 210. The optical sensor 212 can be mounted with non-overlapping (distributed aperture) or overlapping (stereo or more) fields-of-view.

In some example embodiments, the pose estimation module 308 includes an algorithm that combines inertial information from the inertial sensor 210 and image information from the pose estimation module 308 that are coupled to a rigid platform (e.g., AR/VR display device 106) or a rig. In one embodiment, a rig may consist of multiple cameras mounted on a rigid platform with an inertial navigation unit (e.g., inertial sensor 210). A rig may thus have at least one inertial navigation unit and at least one camera.

Figure 4:
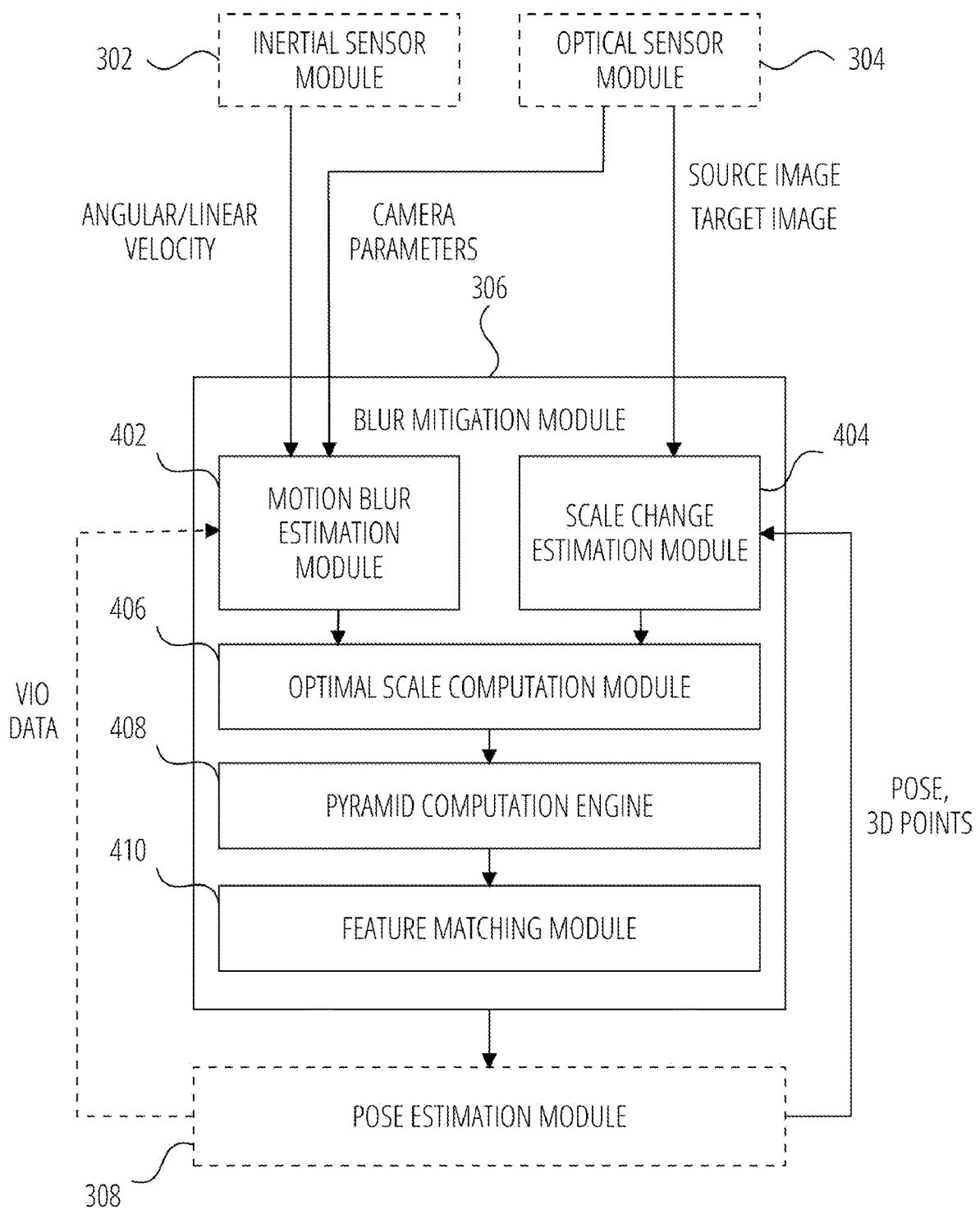
FIG. 4 is a block diagram illustrating a motion blur mitigation module in accordance with one example embodiment.

FIG. 4 is a block diagram illustrating a blur mitigation module 306 in accordance with one example embodiment. The blur mitigation module 306 includes a motion blur estimation module 402, a scale change estimation module 404, an optimal scale computation module 406, a pyramid computation engine 408, and a feature matching module 410.

The motion blur estimation module 402 estimates a motion blur level for an image from the optical sensor 212. In one example embodiment, the motion blur estimation module 402 estimates a motion blur based on the camera operating parameters (obtained from optical sensor module 304) and the angular velocity of the inertial sensor 210 (obtained from inertial sensor module 302). The motion blur estimation module 402 retrieves camera operating parameters of the optical sensor 212 from the optical sensor module 304. For example, the camera operating parameters include settings of the optical sensor module 304 during a capture/exposure time of a current image. The motion blur estimation module 402 also retrieves inertial sensor data from the inertial sensor 210 (where the inertial sensor data is generated during the capture/exposure time of the current image). The motion blur estimation module 402 retrieves an angular velocity from an IMU of the inertial sensor module 302. In one example, the motion blur estimation module 402 samples the angular velocity of the inertial sensor 210 based on inertial sensor data sampled during an exposure time of a current image. In another example, the motion blur estimation module 402 identifies a maximum angular velocity of the inertial sensor 210 based on inertial sensor data captured during an exposure time of the current image.

In another example embodiment, the motion blur estimation module 402 estimates a motion blur based on the camera operating parameters, the angular velocity, and the linear velocity of the visual tracking system 108. The motion blur estimation module 402 retrieves the angular velocity from VIO data (from the pose estimation module 308). The motion blur estimation module 402 retrieves the linear velocity (from the VIO data) and estimates its impact on motion blur in various areas of the current based on the 3D locations of features points in the current image). As previously described above, depicted objects that are closer to the optical sensor 212 show more blur while depicted objects that are further away from the optical sensor 212 show less blur. The pose estimation module 308 tracks 3D locations of feature points and computes the impact of the computed linear velocity on various parts of the current image.

The scale change estimation module 404 estimates a scale change between the source image and the target image by tracking 3D locations of feature points provided by the pose estimation module 308. For example, the change in location of a matched feature point (in the source image and the target image) can indicate that the optical sensor 212 is moving closer or away from a scene.

The optimal scale computation module 406 determines an optimal scale level for the pyramid computation engine 408 based on the estimated motion blur and the scale change. FIG. 8-FIG. 12 illustrate example of different scenarios of the operation of the optimal scale computation module 406.

Figure 8:
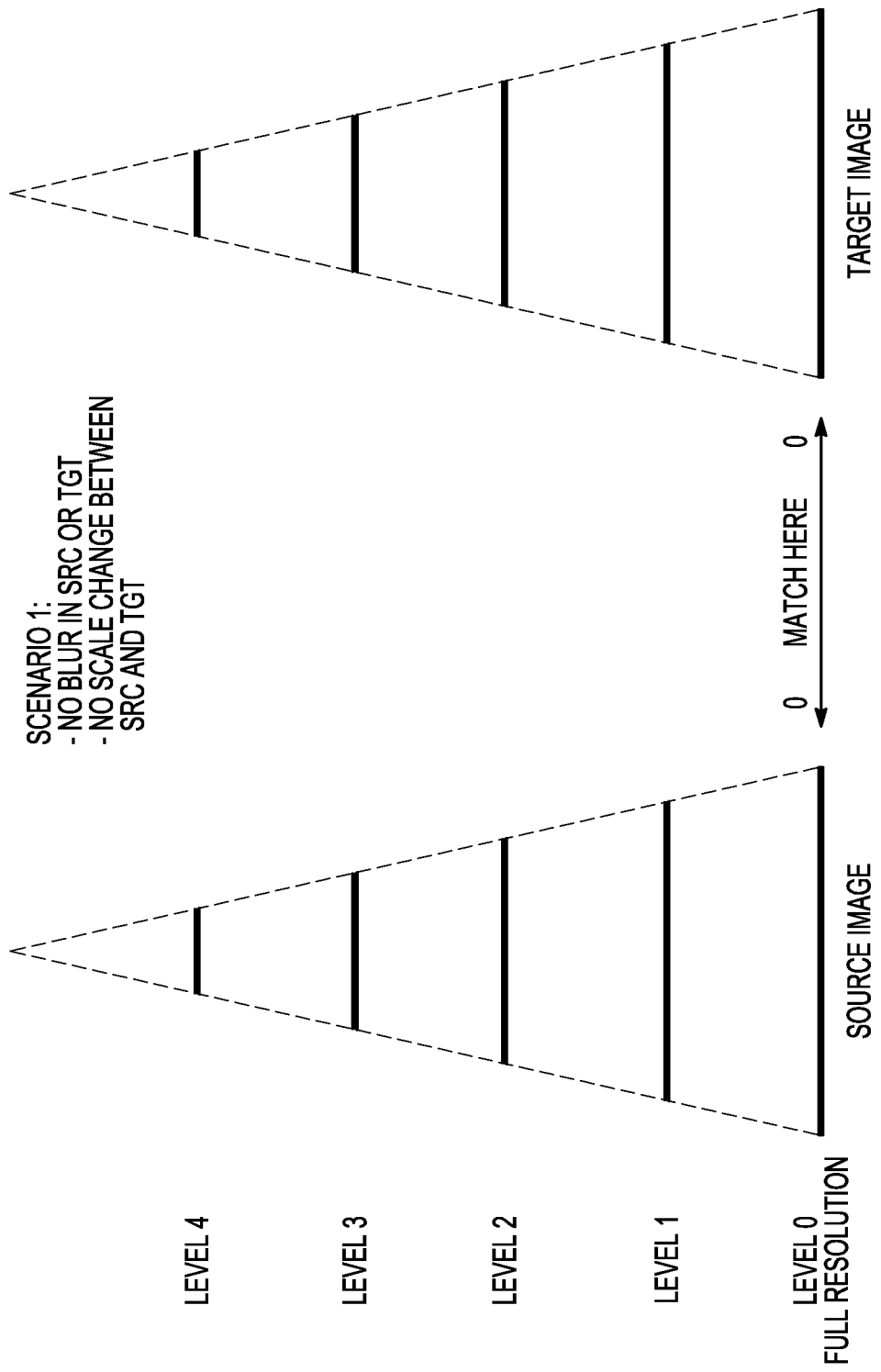
FIG. 8 illustrates an example of a first scenario of the subject matter in accordance with one embodiment.

In FIG. 8, the motion blur estimation module 402 estimates that there is no motion blur in both the source image and the target image. The scale change estimation module 404 estimates that the scale between the source target and the image target has not changed. As such, the optimal scale computation module 406 determines that the optimal scale level for both the source image and the target image remains at the lowest level (e.g., full resolution) and thus no downscaling is performed in this scenario.

Figure 9:
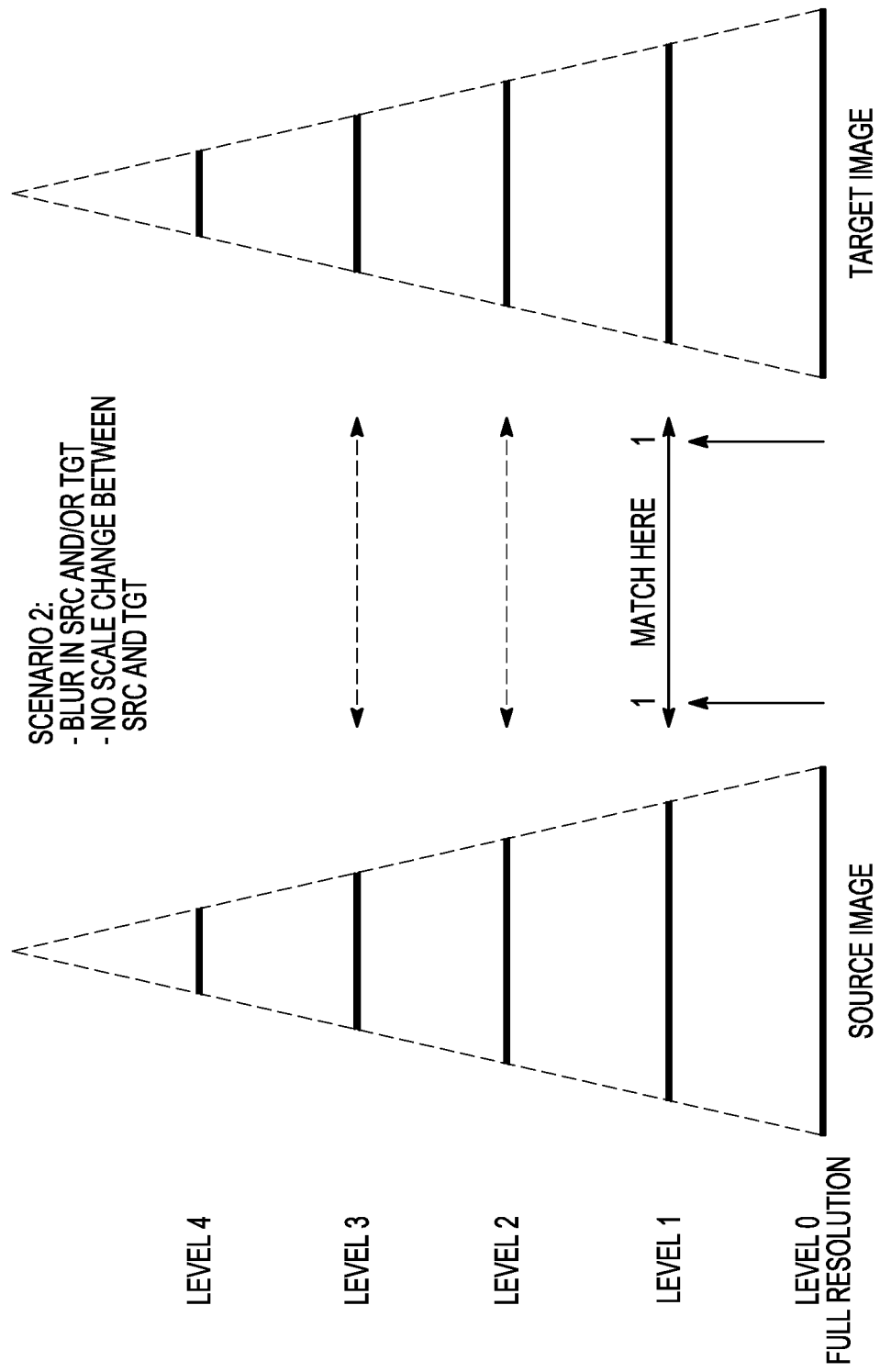
FIG. 9 illustrates an example of a second scenario of the subject matter in accordance with one embodiment.

In FIG. 9, the motion blur estimation module 402 detects motion blur in both the source image and the target image. The scale change estimation module 404 estimates that the scale between the source target and the image target has not changed. As such, the optimal scale computation module 406 determines that the optimal scale level for both the source image and the target image is a first scale level.

Figure 10:
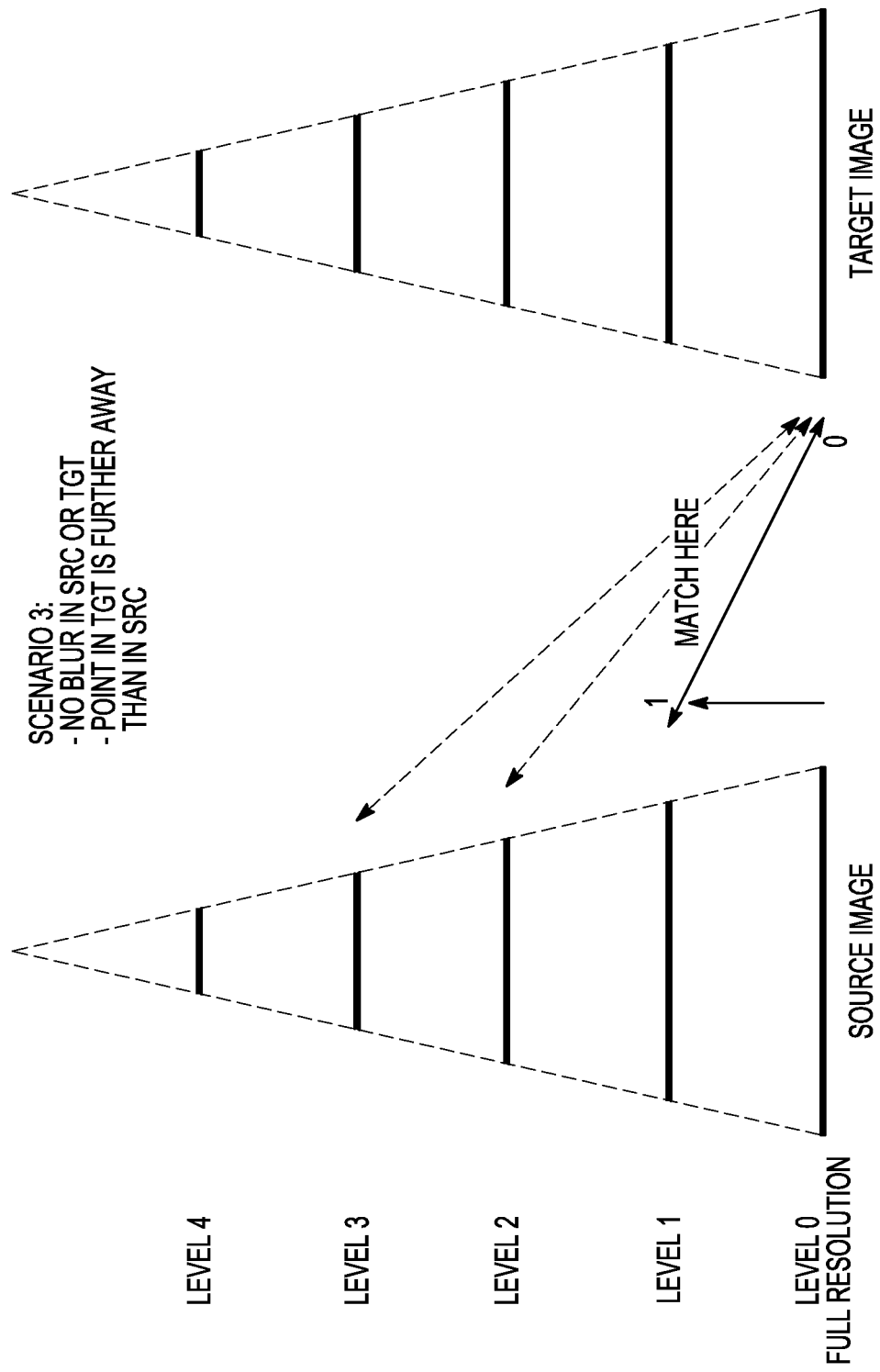
FIG. 10 illustrates an example of a third scenario of the subject matter in accordance with one embodiment.

In FIG. 10, the motion blur estimation module 402 detects that there is no motion blur in both the source image and the target image. The scale change estimation module 404 estimates that the scale between the source target and the image target has changed because feature points in the target image are further away from feature points in the source image. As such, the optimal scale computation module 406 determines that the source optimal scale level for the source image increases to a first scale level, while the target optimal scale level for the target image remains at full resolution.

Figure 11:
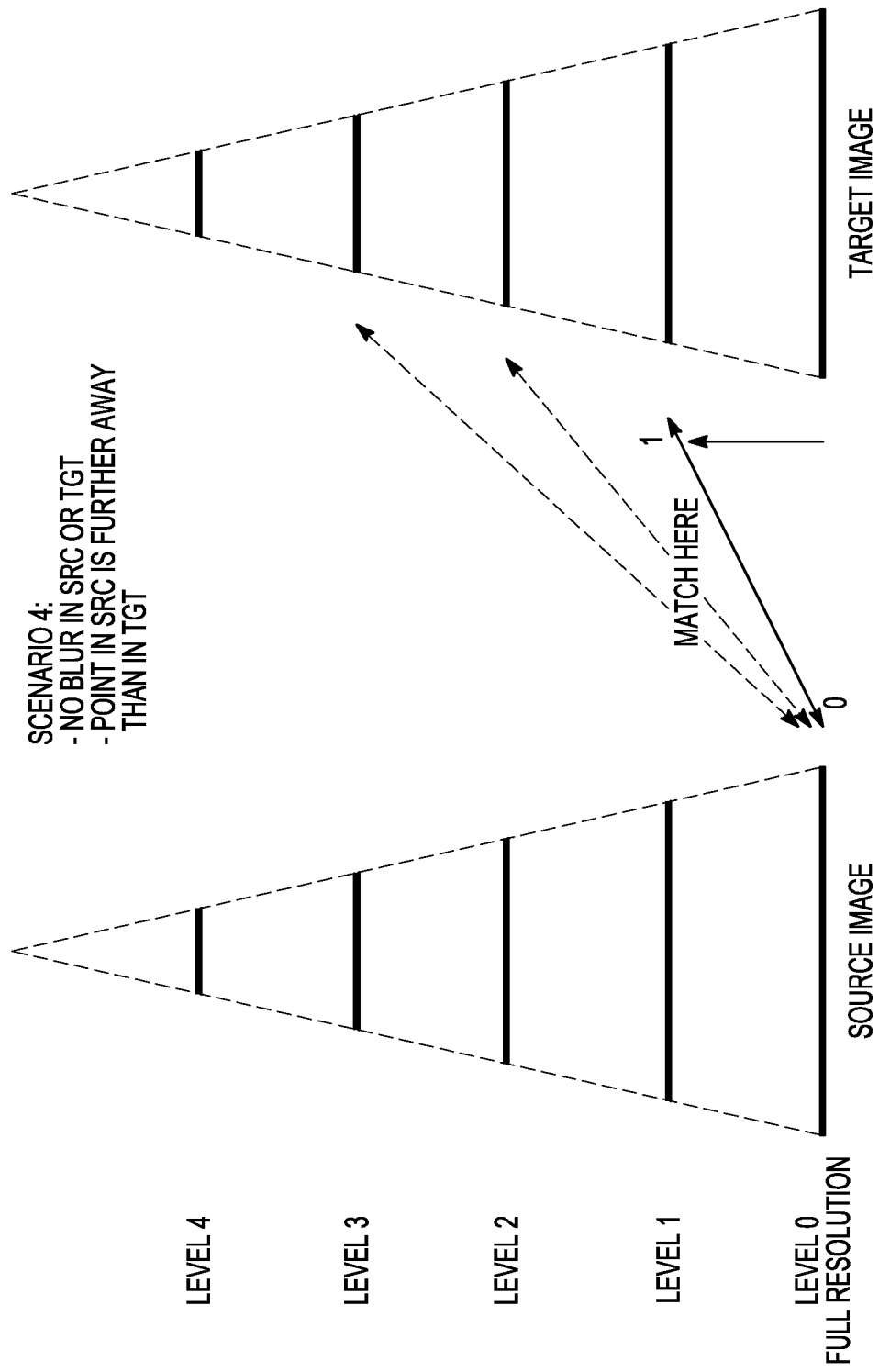
FIG. 11 illustrates an example of a fourth scenario of the subject matter in accordance with one embodiment.

In FIG. 11, the motion blur estimation module 402 detects that there is no motion blur in both the source image and the target image. The scale change estimation module 404 estimates that the scale between the source target and the image target has changed because feature points in the source image are further away from feature points in the target image. As such, the optimal scale computation module 406 determines that the source optimal scale level for the source image remains at full resolution, while the target optimal scale level for the target image increases to a first scale level.

Figure 12:
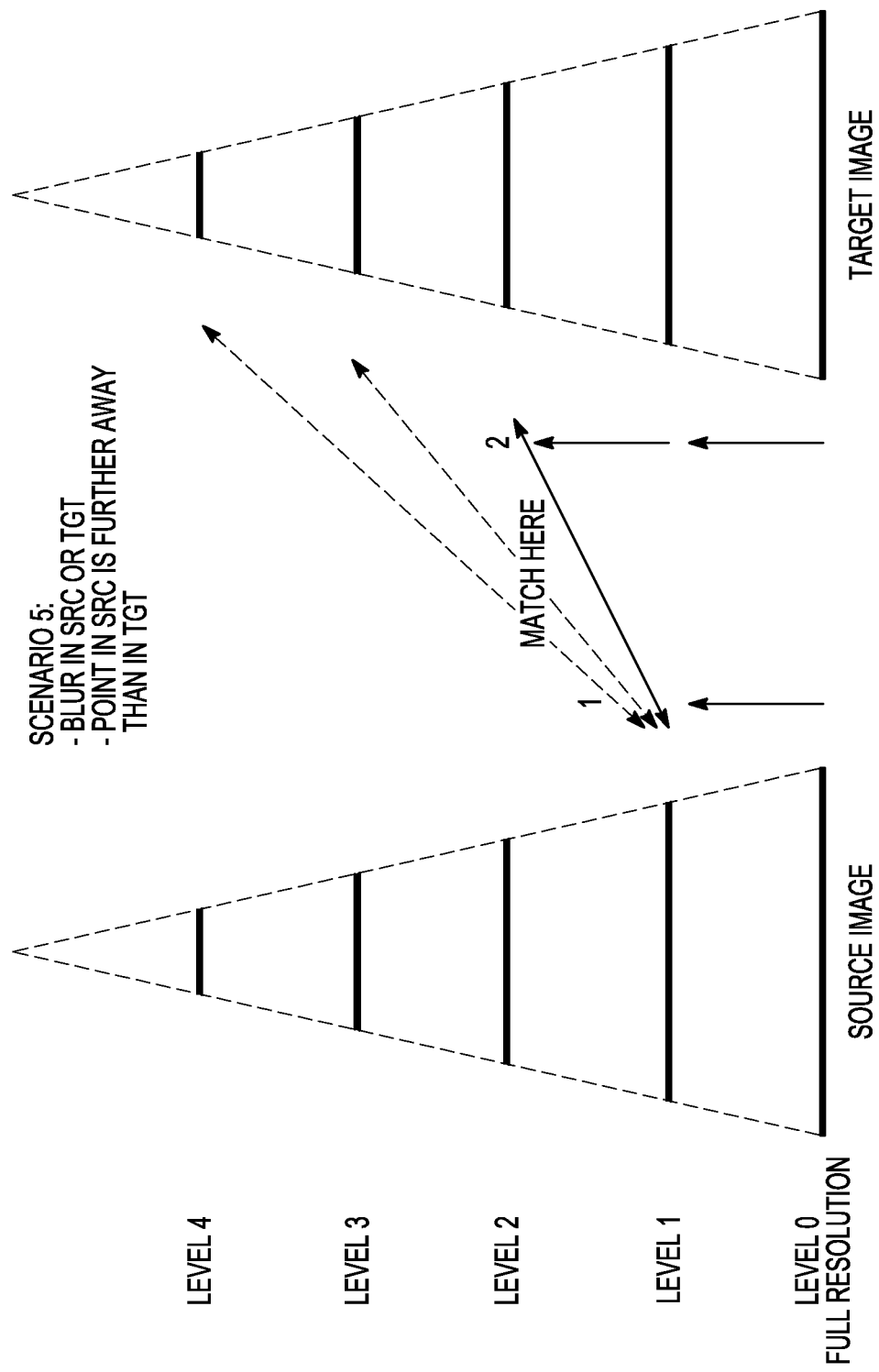
FIG. 12 illustrates an example of a fifth scenario of the subject matter in accordance with one embodiment.

In FIG. 12, the motion blur estimation module 402 detects that there is motion blur in both the source image and the target image. The scale change estimation module 404 estimates that the scale between the source target and the image target has changed because feature points in the source image are further away from feature points in the target image. As such, the optimal scale computation module 406 determines that the source optimal scale level for the source image is increased to a first scale level, while the target optimal scale level for the target image increases to a second scale level.

The pyramid computation engine 408 applies the image pyramid algorithm to the source image at the source optimal scale level to generate a downscale version of the source image. The pyramid computation engine 408 applies the image pyramid algorithm to the target image at the target optimal scale level to generate a downscale version of the target image. In other examples where the optimal scale level corresponds to the full resolution of an image, the pyramid computation engine 408 does not apply the image pyramid algorithm to the image.

The feature matching module 410 matches features between the downscaled version of the source image and the downscaled version of the target image based on the corresponding optimal scale levels determined by the optimal scale computation module 406. In one example, the feature matching module 410 matches features between a full resolution version of the source image and the downscaled version of the target image. In another example, the feature matching module 410 matches features between the downscaled version of the source image and a full resolution version of the target image.

Figure 5:
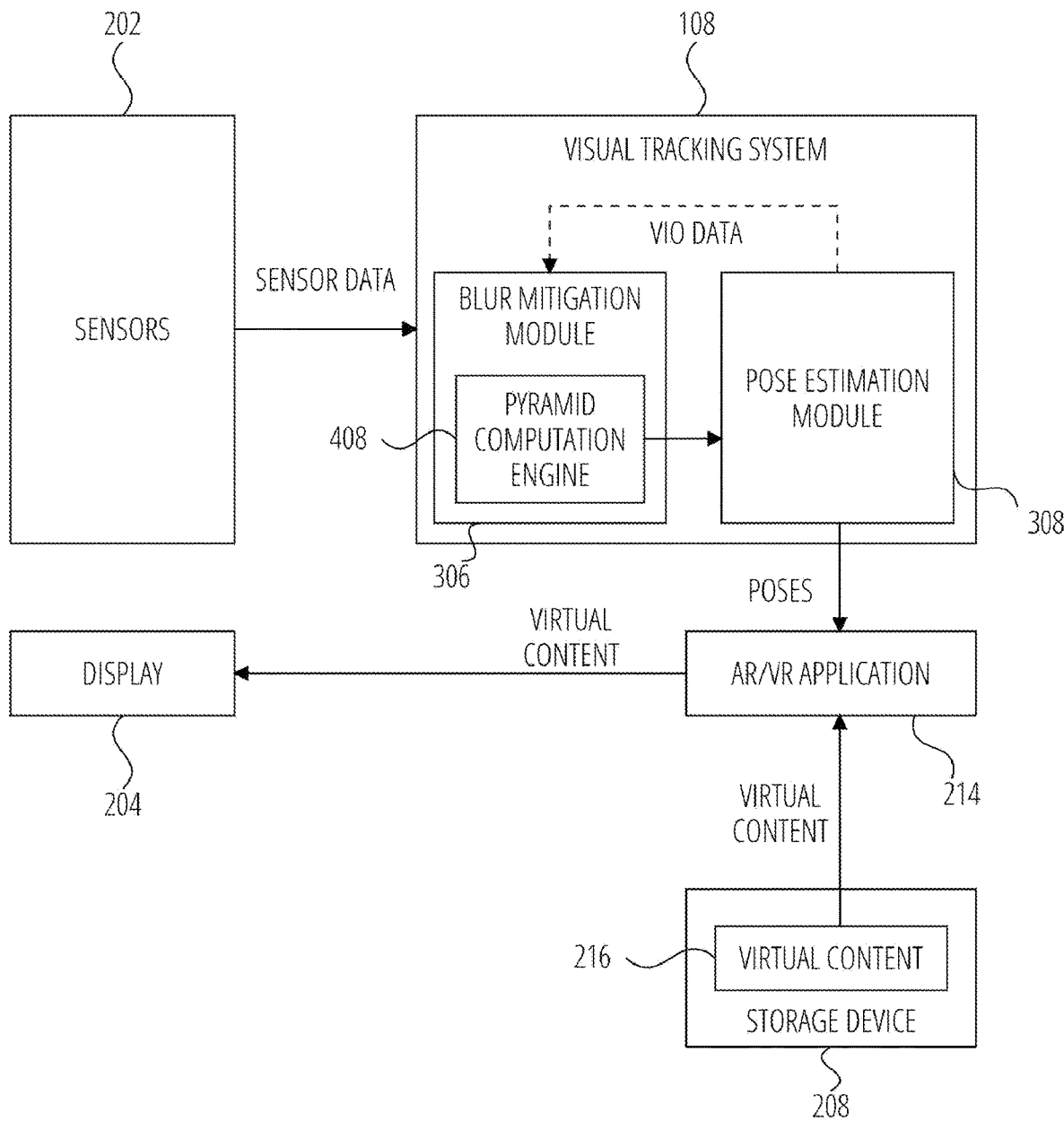
FIG. 5 is a block diagram illustrating a process in accordance with one example embodiment.

FIG. 5 is a block diagram illustrating an example process in accordance with one example embodiment. The visual tracking system 108 receives sensor data from sensors 202 to determine a pose of the visual tracking system 108. The blur mitigation module 306 estimates a motion blur of the source image and the target image based on the sensor data (e.g., angular velocity from IMU or VIO, linear velocity from VIO data from the pose estimation module 308) and camera operating parameters (e.g., exposure time, field of view, resolution) associated with the source image and the target image. The blur mitigation module 306 also estimates a scale change between the source image and the target image by using the VIO data (e.g., 3D points, pose) provided by the pose estimation module 308. The blur mitigation module 306 identifies a source optimal scale level for the pyramid computation engine 408 for the source image based on the motion blur of the source image and the scale change between the source image and the target image. The blur mitigation module 306 identifies a target optimal scale level for the pyramid computation engine 408 for the target image based on the motion blur of the target image and the scale change between the source image and the target image.

The pyramid computation engine 408 applies the image pyramid algorithm to the source image to downscale the source image at the source optimal scale level. The pyramid computation engine 408 applies the image pyramid algorithm to the target image to downscale the target image at the target optimal scale level. The pyramid computation engine 408 provides the downscaled version/full version of the source image and the downscaled version/full version of the target image to the pose estimation module 308.

The pose estimation module 308 identifies a pose of the visual tracking system 108 based on the full resolution or downscaled images provided by the pyramid computation engine 408. The pose estimation module 308 provides pose data to the AR/VR application 214.

The AR/VR application 214 retrieves virtual content 216 from the storage device 208 and causes the virtual content 216 to be displayed at a location (in the display 204) based on the pose of the AR/VR display device 106. It is noted that the pose of the AR/VR display device 106 is also referred to as the pose of the visual tracking system 108 or the optical sensor 212.

Figure 6:
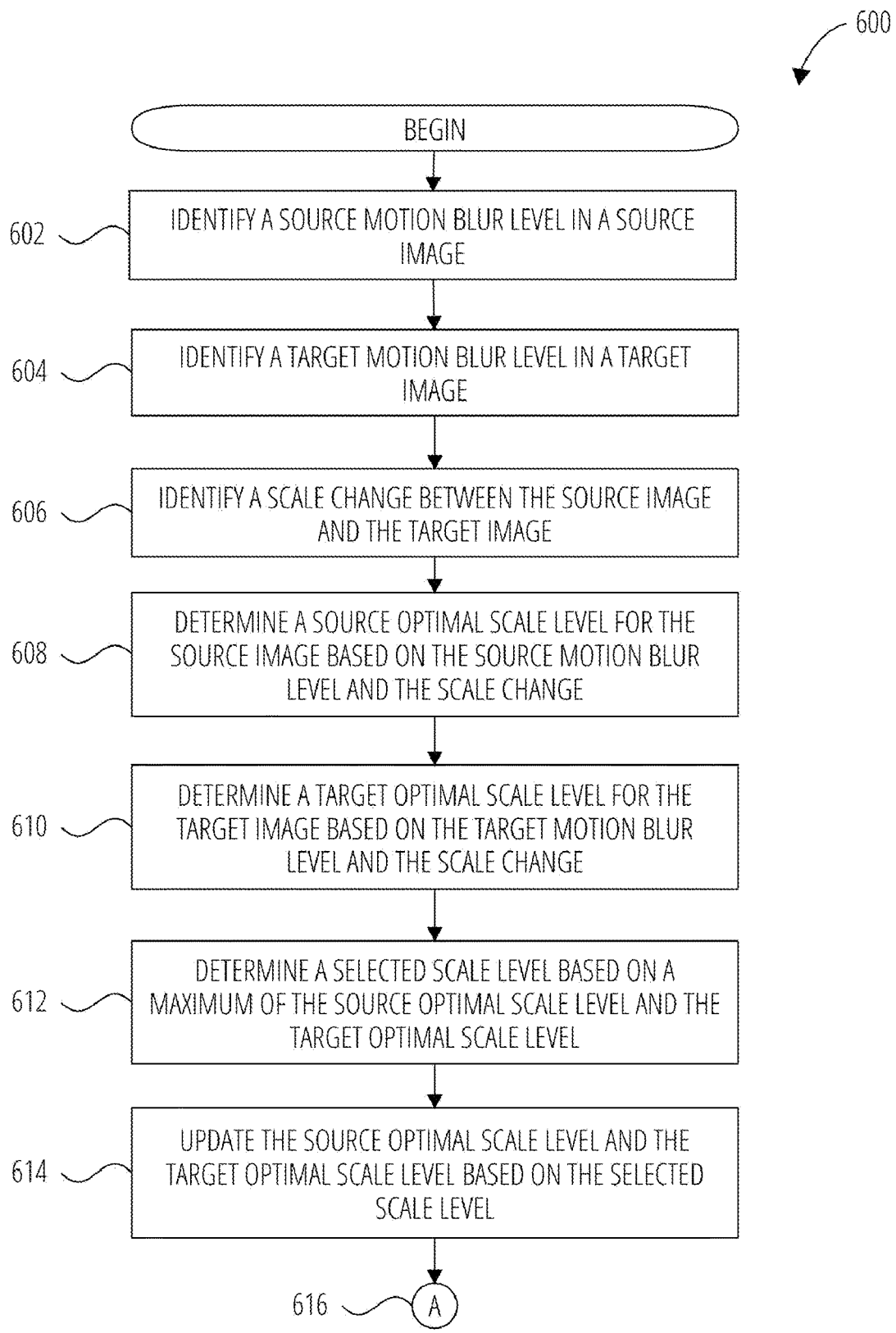
FIG. 6 is a flow diagram illustrating a method for mitigating motion blur in accordance with one example embodiment.

FIG. 6 is a flow diagram illustrating a method 600 for mitigating motion blur in accordance with one example embodiment. Operations in the method 600 may be performed by the visual tracking system 108, using components (e.g., modules, engines) described above with respect to FIG. 4. Accordingly, the method 600 is described by way of example with reference to the blur mitigation module 306. However, it shall be appreciated that at least some of the operations of the method 600 may be deployed on various other hardware configurations or be performed by similar components residing elsewhere.

In block 602, the motion blur estimation module 402 estimates a source motion blur level in a source image. In block 604, the motion blur estimation module 402 estimates a target motion blur level in a target image. In block 606, the scale change estimation module 404 identifies a scale change between the source image and the target image. In block 608, the optimal scale computation module 406 determines a source optimal scale level for the source image based on the source motion blur level and the scale change. In block 610, the optimal scale computation module 406 determines a target optimal scale level for the target image based on the target motion blur level and the scale change. In block 612, the optimal scale computation module 406 determines a selected scale level based on a maximum of the source optimal scale level and the target optimal scale level. In block 614, the pyramid computation engine 408 updates the source optimal scale level and the target optimal scale level based on the selected scale level. The method 600 continues to block A 616.

It is to be noted that other embodiments may use different sequencing, additional or fewer operations, and different nomenclature or terminology to accomplish similar functions. In some embodiments, various operations may be performed in parallel with other operations, either in a synchronous or asynchronous manner. The operations described herein were chosen to illustrate some principles of operations in a simplified form.

Figure 7:
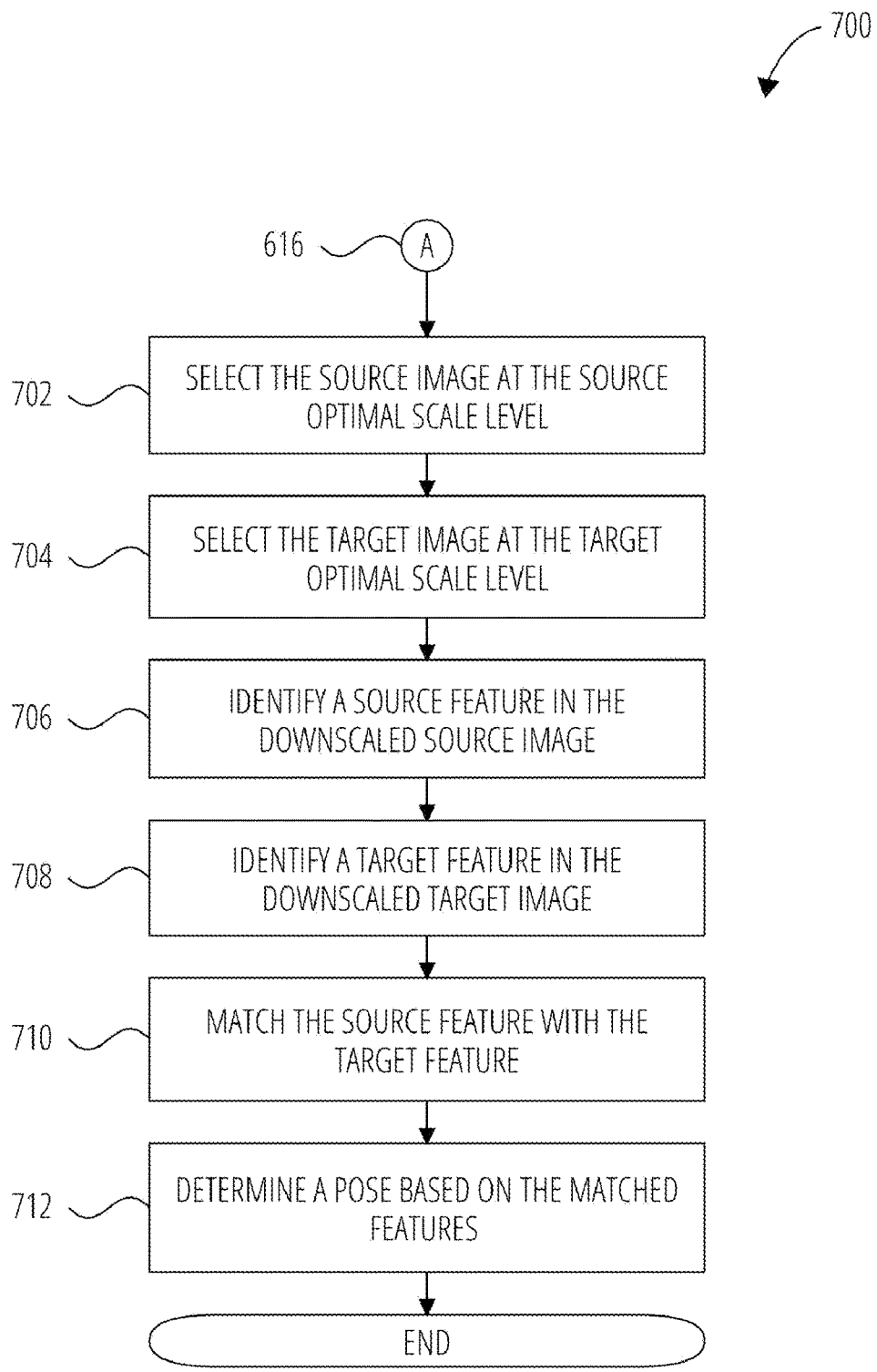
FIG. 7 is a flow diagram illustrating a method for mitigating motion blur in accordance with one example embodiment.

FIG. 7 is a flow diagram illustrating a method 700 for mitigating motion blur in accordance with one example embodiment. Operations in the method 600 may be performed by the visual tracking system 108, using components (e.g., modules, engines) described above with respect to FIG. 4. Accordingly, the method 600 is described by way of example with reference to the blur mitigation module 306. However, it shall be appreciated that at least some of the operations of the method 600 may be deployed on various other hardware configurations or be performed by similar components residing elsewhere.

The method 700 continues from method 600 at block A 616. In block 702, the pyramid computation engine 408 downscales the source image at the source optimal scale level. In block 704, the pyramid computation engine 408 downscales the target image at the target optimal scale level. In block 706, the feature matching module 410 identifies a source feature in the downscaled source image. In block 708, the feature matching module 410 identifies a target feature in the downscaled target image. In block 710, the feature matching module 410 matches the source feature with the target feature. In block 712, the pose estimation module 308 determines a pose based on the matched features.

FIG. 8 illustrates an example of a first scenario of the subject matter in accordance with one embodiment.

FIG. 9 illustrates an example of a second scenario of the subject matter in accordance with one embodiment.

FIG. 10 illustrates an example of a third scenario of the subject matter in accordance with one embodiment.

FIG. 11 illustrates an example of a fourth scenario of the subject matter in accordance with one embodiment.

FIG. 12 illustrates an example of a fifth scenario of the subject matter in accordance with one embodiment.

Figure 13:
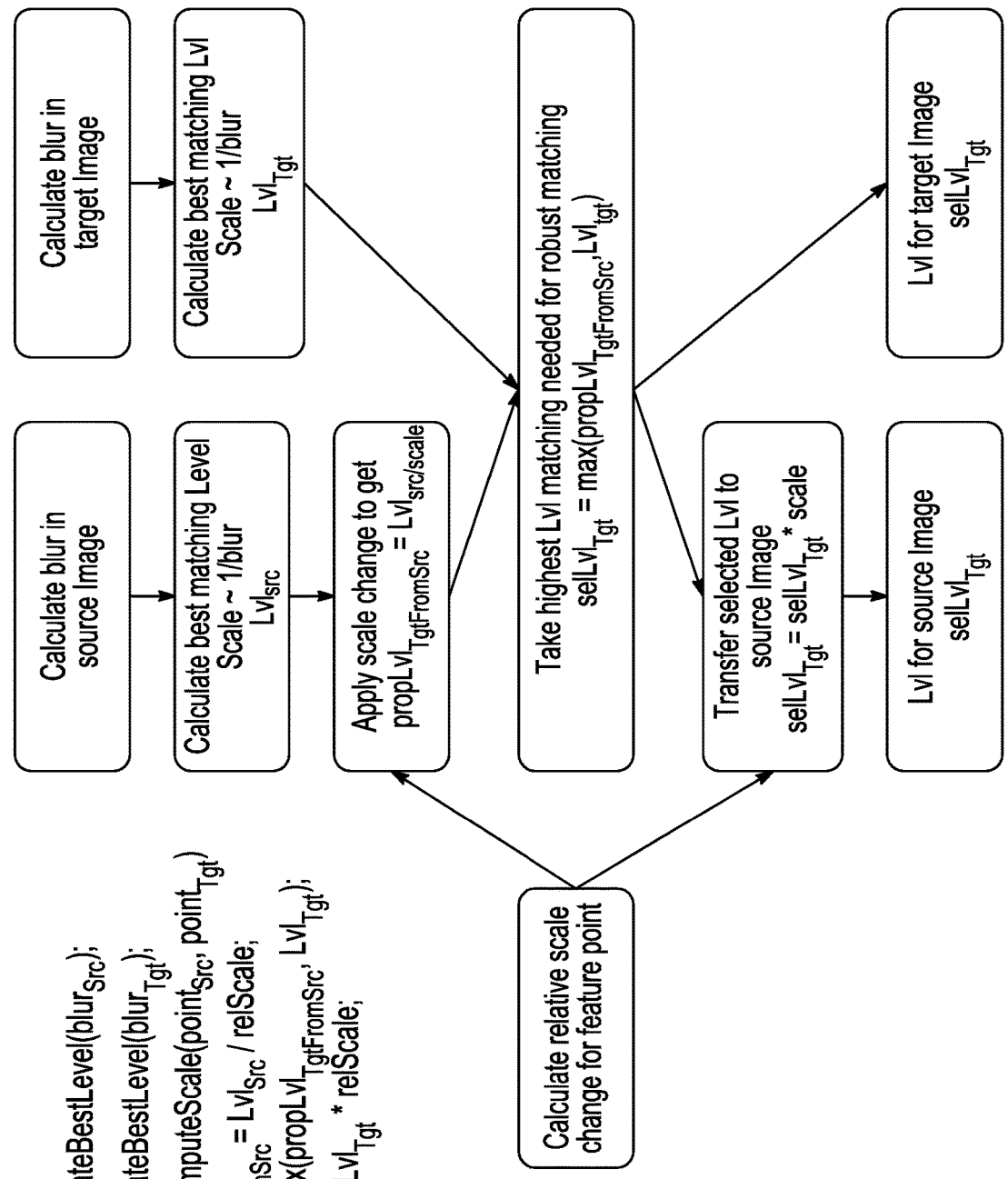
FIG. 13 illustrates an example of a pseudo code for motion blur mitigation in accordance with one embodiment.

FIG. 13 illustrates an example of a pseudo code for motion blur mitigation in accordance with one embodiment.

FIG. 14 illustrates an example of an algorithm for motion blur mitigation in accordance with one embodiment.

SYSTEM WITH HEAD-WEARABLE APPARATUS

Figure 15:
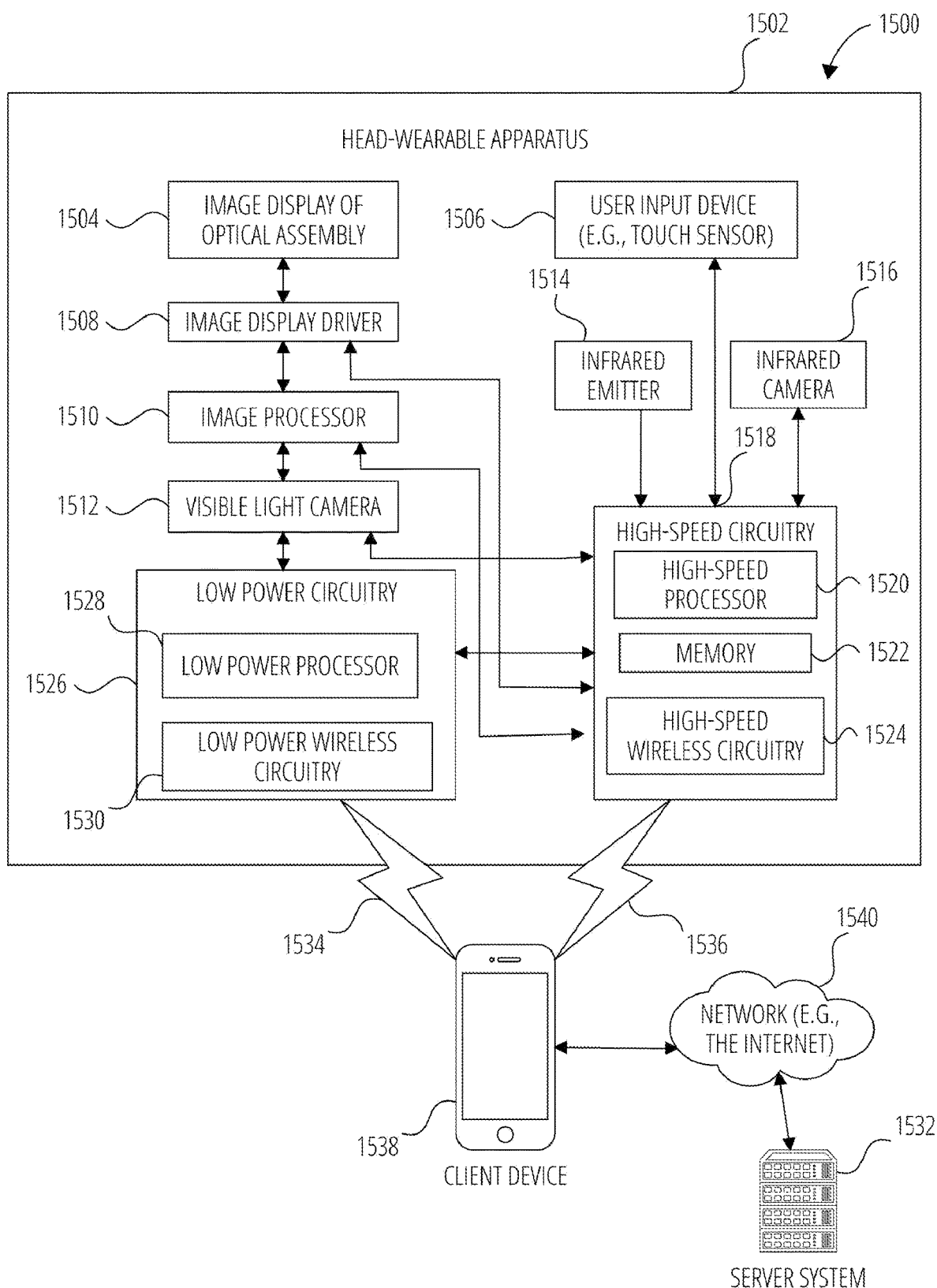
FIG. 15 illustrates a network environment in which a head-wearable device can be implemented according to one example embodiment.

FIG. 15 illustrates a network environment 1500 in which the head-wearable apparatus 1502 can be implemented according to one example embodiment. FIG. 15 is a high-level functional block diagram of an example head-wearable apparatus 1502 communicatively coupled a mobile client device 1538 and a server system 1532 via various network 1540.

head-wearable apparatus 1502 includes a camera, such as at least one of visible light camera 1512, infrared emitter 1514 and infrared camera 1516. The client device 1538 can be capable of connecting with head-wearable apparatus 1502 using both a communication 1534 and a communication 1536. client device 1538 is connected to server system 1532 and network 1540. The network 1540 may include any combination of wired and wireless connections.

The head-wearable apparatus 1502 further includes two image displays of the image display of optical assembly 1504. The two include one associated with the left lateral side and one associated with the right lateral side of the head-wearable apparatus 1502. The head-wearable apparatus 1502 also includes image display driver 1508, image processor 1510, low-power low power circuitry 1526, and high-speed circuitry 1518. The image display of optical assembly 1504 are for presenting images and videos, including an image that can include a graphical user interface to a user of the head-wearable apparatus 1502.

The image display driver 1508 commands and controls the image display of the image display of optical assembly 1504. The image display driver 1508 may deliver image data directly to the image display of the image display of optical assembly 1504 for presentation or may have to convert the image data into a signal or data format suitable for delivery to the image display device. For example, the image data may be video data formatted according to compression formats, such as H. 264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

As noted above, head-wearable apparatus 1502 includes a frame and stems (or temples) extending from a lateral side of the frame. The head-wearable apparatus 1502 further includes a user input device 1506 (e.g., touch sensor or push button) including an input surface on the head-wearable apparatus 1502. The user input device 1506 (e.g., touch sensor or push button) is to receive from the user an input selection to manipulate the graphical user interface of the presented image.

The components shown in FIG. 15 for the head-wearable apparatus 1502 are located on one or more circuit boards, for example a PCB or flexible PCB, in the rims or temples. Alternatively, or additionally, the depicted components can be located in the chunks, frames, hinges, or bridge of the head-wearable apparatus 1502. Left and right can include digital camera elements such as a complementary metal-oxide-semiconductor (CMOS) image sensor, charge coupled device, a camera lens, or any other respective visible or light capturing elements that may be used to capture data, including images of scenes with unknown objects.

The head-wearable apparatus 1502 includes a memory 1522 which stores instructions to perform a subset or all of the functions described herein. memory 1522 can also include storage device.

As shown in FIG. 15, high-speed circuitry 1518 includes high-speed processor 1520, memory 1522, and high-speed wireless circuitry 1524. In the example, the image display driver 1508 is coupled to the high-speed circuitry 1518 and operated by the high-speed processor 1520 in order to drive the left and right image displays of the image display of optical assembly 1504. high-speed processor 1520 may be any processor capable of managing high-speed communications and operation of any general computing system needed for head-wearable apparatus 1502. The high-speed processor 1520 includes processing resources needed for managing high-speed data transfers on communication 1536 to a wireless local area network (WLAN) using high-speed wireless circuitry 1524. In certain examples, the high-speed processor 1520 executes an operating system such as a LINUX operating system or other such operating system of the head-wearable apparatus 1502 and the operating system is stored in memory 1522 for execution. In addition to any other responsibilities, the high-speed processor 1520 executing a software architecture for the head-wearable apparatus 1502 is used to manage data transfers with high-speed wireless circuitry 1524. In certain examples, high-speed wireless circuitry 1524 is configured to implement Institute of Electrical and Electronic Engineers (IEEE) 802.11 communication standards, also referred to herein as Wi-Fi. In other examples, other high-speed communications standards may be implemented by high-speed wireless circuitry 1524.

The low power wireless circuitry 1530 and the high-speed wireless circuitry 1524 of the head-wearable apparatus 1502 can include short range transceivers (Bluetooth™) and wireless wide, local, or wide area network transceivers (e.g., cellular or WiFi). The client device 1538, including the transceivers communicating via the communication 1534 and communication 1536, may be implemented using details of the architecture of the head-wearable apparatus 1502, as can other elements of network 1540.

The memory 1522 includes any storage device capable of storing various data and applications, including, among other things, camera data generated by the left and right, infrared camera 1516 and the image processor 1510, as well as images generated for display by the image display driver 1508 on the image displays of the image display of optical assembly 1504. While memory 1522 is shown as integrated with high-speed circuitry 1518, in other examples, memory 1522 may be an independent standalone element of the head-wearable apparatus 1502. In certain such examples, electrical routing lines may provide a connection through a chip that includes the high-speed processor 1520 from the image processor 1510 or low power processor 1528 to the memory 1522. In other examples, the high-speed processor 1520 may manage addressing of memory 1522 such that the low power processor 1528 will boot the high-speed processor 1520 any time that a read or write operation involving memory 1522 is needed.

As shown in FIG. 15, the low power processor 1528 or high-speed processor 1520 of the head-wearable apparatus 1502 can be coupled to the camera (visible light camera 1512; infrared emitter 1514, or infrared camera 1516), the image display driver 1508, the user input device 1506 (e.g., touch sensor or push button), and the memory 1522.

The head-wearable apparatus 1502 is connected with a host computer. For example, the head-wearable apparatus 1502 is paired with the client device 1538 via the communication 1536 or connected to the server system 1532 via the network 1540. server system 1532 may be one or more computing devices as part of a service or network computing system, for example, that include a processor, a memory, and network communication interface to communicate over the network 1540 with the client device 1538 and head-wearable apparatus 1502.

The client device 1538 includes a processor and a network communication interface coupled to the processor. The network communication interface allows for communication over the network 1540, communication 1534 or communication 1536. client device 1538 can further store at least portions of the instructions for generating a binaural audio content in the client device 1538's memory to implement the functionality described herein.

Output components of the head-wearable apparatus 1502 include visual components, such as a display such as a liquid crystal display (LCD), a plasma display panel (PDP), a light emitting diode (LED) display, a projector, or a waveguide. The image displays of the optical assembly are driven by the image display driver 1508. The output components of the head-wearable apparatus 1502 further include acoustic components (e.g., speakers), haptic components (e.g., a vibratory motor), other signal generators, and so forth. The input components of the head-wearable apparatus 1502, the client device 1538, and server system 1532, such as the user input device 1506, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 1502 may optionally include additional peripheral device elements. Such peripheral device elements may include biometric sensors, additional sensors, or display elements integrated with head-wearable apparatus 1502. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over and communication 1536 from the client device 1538 via the low power wireless circuitry 1530 or high-speed wireless circuitry 1524.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Changes and modifications may be made to the disclosed embodiments without departing from the scope of the present disclosure. These and other changes or modifications are intended to be included within the scope of the present disclosure, as expressed in the following claims.

Figure 16:
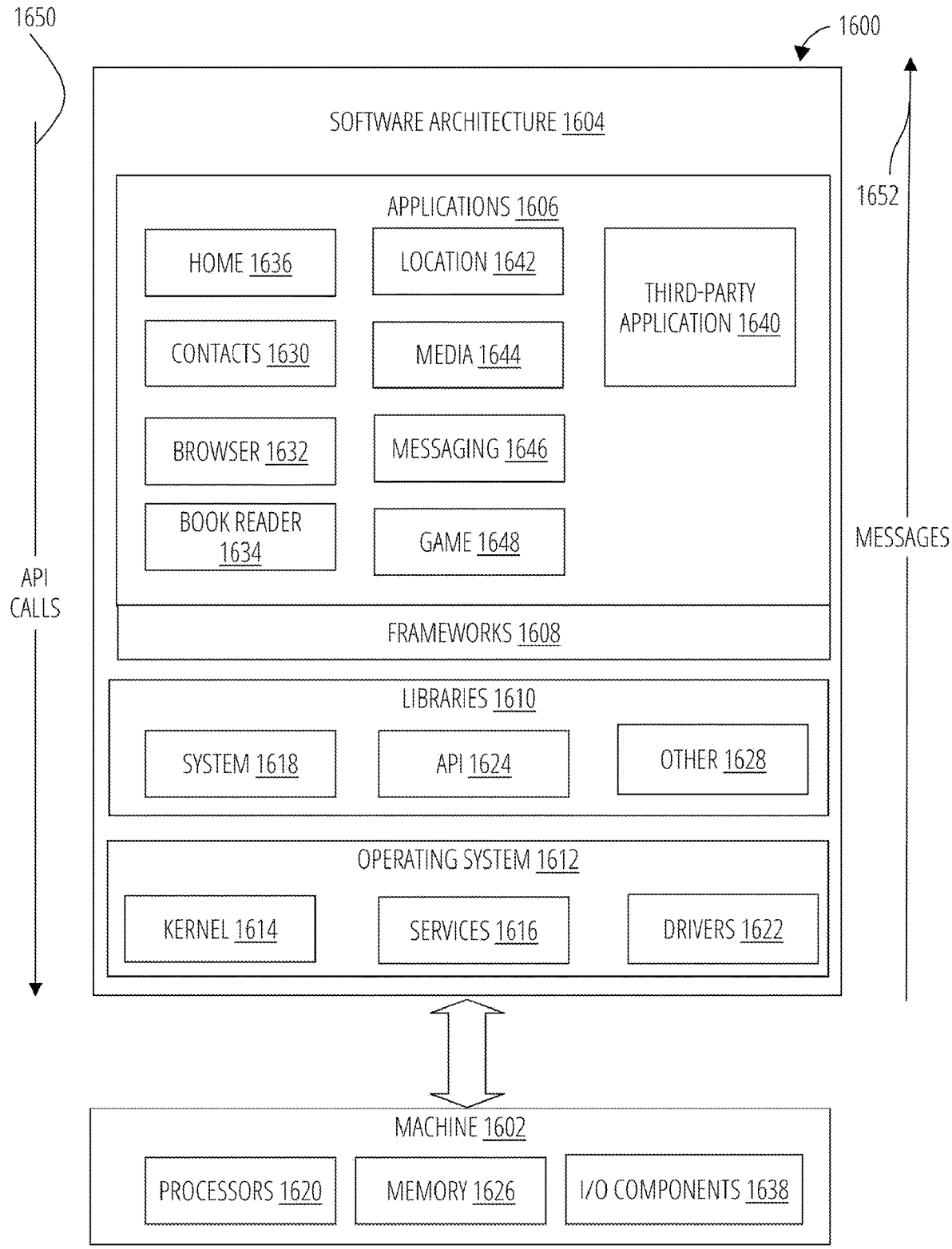
FIG. 16 is block diagram showing a software architecture within which the present disclosure may be implemented, according to an example embodiment.

FIG. 16 is a block diagram 1600 illustrating a software architecture 1604, which can be installed on any one or more of the devices described herein. The software architecture 1604 is supported by hardware such as a machine 1602 that includes Processors 1620, memory 1626, and I/O Components 1638. In this example, the software architecture 1604 can be conceptualized as a stack of layers, where each layer provides a particular functionality. The software architecture 1604 includes layers such as an operating system 1612, libraries 1610, frameworks 1608, and applications 1606. Operationally, the applications 1606 invoke API calls 1650 through the software stack and receive messages 1652 in response to the API calls 1650.

The operating system 1612 manages hardware resources and provides common services. The operating system 1612 includes, for example, a kernel 1614, services 1616, and drivers 1622. The kernel 1614 acts as an abstraction layer between the hardware and the other software layers. For example, the kernel 1614 provides memory management, Processor management (e.g., scheduling), Component management, networking, and security settings, among other functionalities. The services 1616 can provide other common services for the other software layers. The drivers 1622 are responsible for controlling or interfacing with the underlying hardware. For instance, the drivers 1622 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1610 provide a low-level common infrastructure used by the applications 1606. The libraries 1610 can include system libraries 1618 (e.g., C standard library) that provide functions such as memory allocation functions, string manipulation functions, mathematic functions, and the like. In addition, the libraries 1610 can include API libraries 1624 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1610 can also include a wide variety of other libraries 1628 to provide many other APIs to the applications 1606.

The frameworks 1608 provide a high-level common infrastructure that is used by the applications 1606. For example, the frameworks 1608 provide various graphical user interface (GUI) functions, high-level resource management, and high-level location services. The frameworks 1608 can provide a broad spectrum of other APIs that can be used by the applications 1606, some of which may be specific to a particular operating system or platform.

In an example embodiment, the applications 1606 may include a home application 1636, a contacts application 1630, a browser application 1632, a book reader application 1634, a location application 1642, a media application 1644, a messaging application 1646, a game application 1648, and a broad assortment of other applications such as a third-party application 1640. The applications 1606 are programs that execute functions defined in the programs. Various programming languages can be employed to create one or more of the applications 1606, structured in a variety of manners, such as object-oriented programming languages (e.g., Objective-C, Java, or C++) or procedural programming languages (e.g., C or assembly language). In a specific example, the third-party application 1640 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1640 can invoke the API calls 1650 provided by the operating system 1612 to facilitate functionality described herein.

Figure 17:
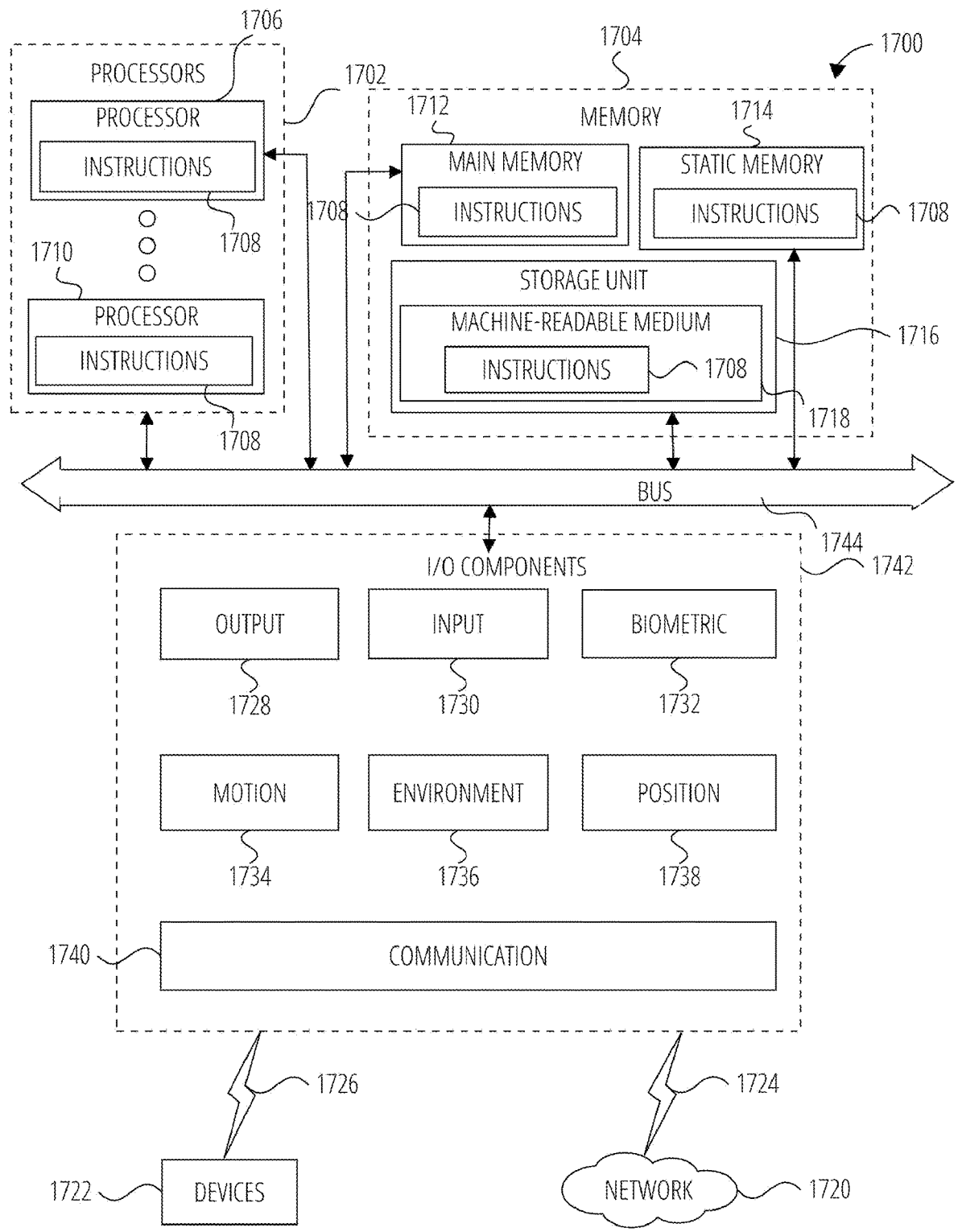
FIG. 17 is a diagrammatic representation of a machine in the form of a computer system within which a set of instructions may be executed for causing the machine to perform any one or more of the methodologies discussed herein, according to one example embodiment.

FIG. 17 is a diagrammatic representation of the machine 1700 within which instructions 1708 (e.g., software, a program, an application, an applet, an app, or other executable code) for causing the machine 1700 to perform any one or more of the methodologies discussed herein may be executed. For example, the instructions 1708 may cause the machine 1700 to execute any one or more of the methods described herein. The instructions 1708 transform the general, non-programmed machine 1700 into a particular machine 1700 programmed to carry out the described and illustrated functions in the manner described. The machine 1700 may operate as a standalone device or may be coupled (e.g., networked) to other machines. In a networked deployment, the machine 1700 may operate in the capacity of a server machine or a client machine in a server-client network environment, or as a peer machine in a peer-to-peer (or distributed) network environment. The machine 1700 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1708, sequentially or otherwise, that specify actions to be taken by the machine 1700. Further, while only a single machine 1700 is illustrated, the term "machine" shall also be taken to include a collection of machines that individually or jointly execute the instructions 1708 to perform any one or more of the methodologies discussed herein.

The machine 1700 may include Processors 1702, memory 1704, and I/O Components 1742, which may be configured to communicate with each other via a bus 1744. In an example embodiment, the Processors 1702 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 1706 and a Processor 1710 that execute the instructions 1708. The term "Processor" is intended to include multi-core Processors that may comprise two or more independent Processors (sometimes referred to as "cores") that may execute instructions contemporaneously. Although FIG. 17 shows multiple Processors 1702, the machine 1700 may include a single Processor with a single core, a single Processor with multiple cores (e.g., a multi-core Processor), multiple Processors with a single core, multiple Processors with multiples cores, or any combination thereof.

The memory 1704 includes a main memory 1712, a static memory 1714, and a storage unit 1716, both accessible to the Processors 1702 via the bus 1744. The main memory 1704, the static memory 1714, and storage unit 1716 store the instructions 1708 embodying any one or more of the methodologies or functions described herein. The instructions 1708 may also reside, completely or partially, within the main memory 1712, within the static memory 1714, within machine-readable medium 1718 within the storage unit 1716, within at least one of the Processors 1702 (e.g., within the Processor's cache memory), or any suitable combination thereof, during execution thereof by the machine 1700.

The I/O Components 1742 may include a wide variety of Components to receive input, provide output, produce output, transmit information, exchange information, capture measurements, and so on. The specific I/O Components 1742 that are included in a particular machine will depend on the type of machine. For example, portable machines such as mobile phones may include a touch input device or other such input mechanisms, while a headless server machine will likely not include such a touch input device. It will be appreciated that the I/O Components 1742 may include many other Components that are not shown in FIG. 17. In various example embodiments, the I/O Components 1742 may include output Components 1728 and input Components 1730. The output Components 1728 may include visual Components (e.g., a display such as a plasma display panel (PDP), a light emitting diode (LED) display, a liquid crystal display (LCD), a projector, or a cathode ray tube (CRT)), acoustic Components (e.g., speakers), haptic Components (e.g., a vibratory motor, resistance mechanisms), other signal generators, and so forth. The input Components 1730 may include alphanumeric input Components (e.g., a keyboard, a touch screen configured to receive alphanumeric input, a photo-optical keyboard, or other alphanumeric input Components), point-based input Components (e.g., a mouse, a touchpad, a trackball, a joystick, a motion sensor, or another pointing instrument), tactile input Components (e.g., a physical button, a touch screen that provides location and/or force of touches or touch gestures, or other tactile input Components), audio input Components (e.g., a microphone), and the like.

In further example embodiments, the I/O Components 1742 may include biometric Components 1732, motion Components 1734, environmental Components 1736, or position Components 1738, among a wide array of other Components. For example, the biometric Components 1732 include Components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion Components 1734 include acceleration sensor Components (e.g., accelerometer), gravitation sensor Components, rotation sensor Components (e.g., gyroscope), and so forth. The environmental Components 1736 include, for example, illumination sensor Components (e.g., photometer), temperature sensor Components (e.g., one or more thermometers that detect ambient temperature), humidity sensor Components, pressure sensor Components (e.g., barometer), acoustic sensor Components (e.g., one or more microphones that detect background noise), proximity sensor Components (e.g., infrared sensors that detect nearby objects), gas sensors (e.g., gas detection sensors to detection concentrations of hazardous gases for safety or to measure pollutants in the atmosphere), or other Components that may provide indications, measurements, or signals corresponding to a surrounding physical environment. The position Components 1738 include location sensor Components (e.g., a GPS receiver Component), altitude sensor Components (e.g., altimeters or barometers that detect air pressure from which altitude may be derived), orientation sensor Components (e.g., magnetometers), and the like.

Communication may be implemented using a wide variety of technologies. The I/O Components 1742 further include communication Components 1740 operable to couple the machine 1700 to a network 1720 or devices 1722 via a coupling 1724 and a coupling 1726, respectively. For example, the communication Components 1740 may include a network interface Component or another suitable device to interface with the network 1720. In further examples, the communication Components 1740 may include wired communication Components, wireless communication Components, cellular communication Components, Near Field Communication (NFC) Components, Bluetooth® Components (e.g., Bluetooth® Low Energy), WiFi® Components, and other communication Components to provide communication via other modalities. The devices 1722 may be another machine or any of a wide variety of peripheral devices (e.g., a peripheral device coupled via a USB).

Moreover, the communication Components 1740 may detect identifiers or include Components operable to detect identifiers. For example, the communication Components 1740 may include Radio Frequency Identification (RFID) tag reader Components, NFC smart tag detection Components, optical reader Components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection Components (e.g., microphones to identify tagged audio signals). In addition, a variety of information may be derived via the communication Components 1740, such as location via Internet Protocol (IP) geolocation, location via Wi-Fi® signal triangulation, location via detecting an NFC beacon signal that may indicate a particular location, and so forth.

The various memories (e.g., memory 1704, main memory 1712, static memory 1714, and/or memory of the Processors 1702) and/or storage unit 1716 may store one or more sets of instructions and data structures (e.g., software) embodying or used by any one or more of the methodologies or functions described herein. These instructions (e.g., the instructions 1708), when executed by Processors 1702, cause various operations to implement the disclosed embodiments.

The instructions 1708 may be transmitted or received over the network 1720, using a transmission medium, via a network interface device (e.g., a network interface Component included in the communication Components 1740) and using any one of a number of well-known transfer protocols (e.g., hypertext transfer protocol (HTTP)). Similarly, the instructions 1708 may be transmitted or received using a transmission medium via the coupling 1726 (e.g., a peer-to-peer coupling) to the devices 1722.

As used herein, the terms "Machine-Storage Medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of Machine-Storage Media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "Machine-Storage Media," "computer-storage media," and "device-storage media" specifically exclude carrier waves, modulated data signals, and other such media, at least some of which are covered under the term "signal medium" discussed below.

The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1416 for execution by the machine 1400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "Computer-Readable Medium," and "device-readable medium" mean the same thing and may be used interchangeably in this disclosure. The terms are defined to include both Machine-Storage Media and transmission media. Thus, the terms include both storage devices/media and carrier waves/modulated data signals.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

EXAMPLES

Example 1 is a method for selective motion blur mitigation in a visual tracking system comprising: accessing a first image generated by an optical sensor of the visual tracking system; accessing a second image generated by the optical sensor of the visual tracking system, the second image following the first image; determining a first motion blur level of the first image; determining a second motion blur level of the second image; identifying a scale change between the first image and the second image; determining a first optimal scale level for the first image based on the first motion blur level and the scale change; and determining a second optimal scale level for the second image based on the second motion blur level and the scale change.

Example 2 includes example 1, further comprising: downscaling the first image using a multilevel downscaling algorithm at the first optimal scale level to generate a first downscaled image; and downscaling the second image using the multilevel downscaling algorithm at the first optimal scale level to generate a second downscaled image.

Example 3 includes example 2, further comprising: identifying a first feature in the first downscaled image; identifying a second feature in the second downscaled image; and matching the first feature with the second feature.

Example 4 includes example 1, wherein determining the first optimal scale level for the first image comprises: calculating a first matching level based on the first motion blur level; applying the scale change to the first matching level to generate a scaled matching level of the first image; identifying a selected scale level based on a maximum level between the scaled matching level of the first image and a second matching level based on the second motion blur level; and applying the selected scale level to the first optimal scale level for the first image.

Example 5 includes example 1, wherein determining the second optimal scale level for the second image comprises: calculating a second matching level based on the second motion blur level; identifying a selected scale level based on a maximum level between a scaled matching level of the first image and the second matching level based on the second motion blur level; and applying the selected scale level to the second optimal scale level for the second image.

Example 6 includes example 1, further comprising: calculating a first matching level based on the first motion blur level; calculating a second matching level based on the second motion blur level; determining a base matching level based on a maximum of the first matching level and the second matching level; and adjusting the base matching level based on the scale change.

Example 7 includes example 1, wherein determining the first motion blur level comprises: identifying first camera operating parameters of the optical sensor for the first image; and determining a first motion of the optical sensor for the first image, wherein determining the second motion blur level comprises: identifying second camera operating parameters of the optical sensor for the second image; and determining a second motion of the optical sensor for the second image.

Example 8 includes example 7, wherein determining the first motion of the optical sensor for the first image comprises: retrieving first inertial sensor data from an inertial sensor of the visual tracking system for the first image; and determining a first angular velocity of the visual tracking system based on the first inertial sensor data, wherein the first motion blur level is based on the first camera operating parameters and the first angular velocity of the visual tracking system without analyzing a content of the first image, wherein determining the second motion of the optical sensor for the second image comprises: retrieving second inertial sensor data from the inertial sensor of the visual tracking system for the second image; and determining a second angular velocity of the visual tracking system based on the second inertial sensor data, wherein the second motion blur level is based on the second camera operating parameters and the second angular velocity of the visual tracking system without analyzing a content of the second image.

Example 9 includes example 7, wherein determining the first motion of the optical sensor for the first image comprises: accessing first VIO data from a VIO system of the visual tracking system, the first VIO data comprising a first estimated angular velocity of the optical sensor, a first estimated linear velocity of the optical sensor, and locations of feature points in the first image, wherein the first motion blur level is based on the first camera operating parameters and the first VIO data without analyzing a content of the first image, wherein the first motion blur in different areas of the first image is based on the first estimated angular velocity of the optical sensor, the first estimated linear velocity of the optical sensor, and the 3D locations of the feature points in the corresponding different areas of the first image with respect to the optical sensor, wherein determining the first motion of the optical sensor for the first image comprises: accessing second VIO data from the VIO system of the visual tracking system, the second VIO data comprising a second estimated angular velocity of the optical sensor, a second estimated linear velocity of the optical sensor, and locations of feature points in the second image, wherein the second motion blur level is based on the second camera operating parameters and the second VIO data without analyzing a content of the second image, wherein the second motion blur in different areas of the second image is based on the second estimated angular velocity of the optical sensor, the second estimated linear velocity of the optical sensor, and the 3D locations of the feature points in the corresponding different areas of the second image with respect to the optical sensor.

Example 10 includes example 7, wherein the first or second source camera operating parameters comprise a combination of an exposure time of the optical sensor, a field of view of the optical sensor, an ISO value of the optical sensor, and an image resolution, wherein the first image comprises a source image, wherein the second image comprises a target image.

Example 11 is a computing apparatus comprising: a processor; and a memory storing instructions that, when executed by the processor, configure the apparatus to: access a first image generated by an optical sensor of a visual tracking system; access a second image generated by the optical sensor of the visual tracking system, the second image following the first image; determine a first motion blur level of the first image; determine a second motion blur level of the second image; identify a scale change between the first image and the second image; determine a first optimal scale level for the first image based on the first motion blur level and the scale change; and determine a second optimal scale level for the second image based on the second motion blur level and the scale change.

Example 12 includes example 11, wherein the instructions further configure the apparatus to: downscaling the first image use a multilevel downscaling algorithm at the first optimal scale level to generate a first downscaled image; and downscaling the second image use the multilevel downscaling algorithm at the first optimal scale level to generate a second downscaled image.

Example 13 includes example 12, wherein the instructions further configure the apparatus to: identify a first feature in the first downscaled image; identify a second feature in the second downscaled image; and match the first feature with the second feature.

Example 14 includes example 11, wherein determining the first optimal scale level for the first image comprises: calculate a first matching level based on the first motion blur level; apply the scale change to the first matching level to generate a scaled matching level of the first image; identify a selected scale level based on a maximum level between the scaled matching level of the first image and a second matching level based on the second motion blur level; and apply the selected scale level to the first optimal scale level for the first image.

Example 15 includes example 11, wherein determining the second optimal scale level for the second image comprises: calculate a second matching level based on the second motion blur level; identify a selected scale level based on a maximum level between a scaled matching level of the first image and the second matching level based on the second motion blur level; and apply the selected scale level to the second optimal scale level for the second image.

Example 16 includes example 11, wherein the instructions further configure the apparatus to: calculate a first matching level based on the first motion blur level; calculate a second matching level based on the second motion blur level; determine a base matching level based on a maximum of the first matching level and the second matching level; and adjust the base matching level based on the scale change.

Example 17 includes example 11, wherein determining the first motion blur level comprises: identify first camera operating parameters of the optical sensor for the first image; and determine a first motion of the optical sensor for the first image, wherein determining the second motion blur level comprises: identify second camera operating parameters of the optical sensor for the second image; and determine a second motion of the optical sensor for the second image.

Example 18 includes example 17, wherein determining the first motion of the optical sensor for the first image comprises: retrieve first inertial sensor data from an inertial sensor of the visual tracking system for the first image; and determine a first angular velocity of the visual tracking system based on the first inertial sensor data, wherein the first motion blur level is based on the first camera operating parameters and the first angular velocity of the visual tracking system without analyzing a content of the first image, wherein determining the second motion of the optical sensor for the second image comprises: retrieve second inertial sensor data from the inertial sensor of the visual tracking system for the second image; and determine a second angular velocity of the visual tracking system based on the second inertial sensor data, wherein the second motion blur level is based on the second camera operating parameters and the second angular velocity of the visual tracking system without analyzing a content of the second image.

Example 19 includes example 17, wherein determining the first motion of the optical sensor for the first image comprises: access first VIO data from a VIO system of the visual tracking system, the first VIO data comprising a first estimated angular velocity of the optical sensor, a first estimated linear velocity of the optical sensor, and locations of feature points in the first image, wherein the first motion blur level is based on the first camera operating parameters and the first VIO data without analyzing a content of the first image, wherein the first motion blur in different areas of the first image is based on the first estimated angular velocity of the optical sensor, the first estimated linear velocity of the optical sensor, and the 3D locations of the feature points in the corresponding different areas of the first image with respect to the optical sensor, wherein determining the first motion of the optical sensor for the first image comprises: access second VIO data from the VIO system of the visual tracking system, the second VIO data comprising a second estimated angular velocity of the optical sensor, a second estimated linear velocity of the optical sensor, and locations of feature points in the second image, wherein the second motion blur level is based on the second camera operating parameters and the second VIO data without analyzing a content of the second image, wherein the second motion blur in different areas of the second image is based on the second estimated angular velocity of the optical sensor, the second estimated linear velocity of the optical sensor, and the 3D locations of the feature points in the corresponding different areas of the second image with respect to the optical sensor.

Example 20 is a non-transitory computer-readable storage medium, the computer-readable storage medium including instructions that when executed by a computer, cause the computer to: access a first image generated by an optical sensor of a visual tracking system; access a second image generated by the optical sensor of the visual tracking system, the second image following the first image; determine a first motion blur level of the first image; determine a second motion blur level of the second image; identify a scale change between the first image and the second image; determine a first optimal scale level for the first image based on the first motion blur level and the scale change; and determine a second optimal scale level for the second image based on the second motion blur level and the scale change.

What is claimed is:

1. A method comprising:
    accessing a first image and a second image following the first image, the first image and the second image generated by an optical sensor of a visual tracking system;
    determining a first motion blur level of the first image and a second motion blur level of the second image;
    identifying a scale change between the first image and the second image;
    calculating a first matching level based on the first motion blur level, and a second matching level based on the second motion blur level;
    determining a base matching level based on a maximum of the first matching level and the second matching level; and
    adjusting the base matching level based on the scale change.

2. The method of claim 1, further comprising:
    determining a first optimal scale level for the first image based on the first motion blur level and the scale change; and
    determining a second optimal scale level for the second image based on the second motion blur level and the scale change.

3. The method of claim 2, further comprising:
    downscaling the first image at the first optimal scale level to generate a first downscaled image; and
    downscaling the second image at the first optimal scale level to generate a second downscaled image.

4. The method of claim 3, further comprising:
    identifying a first feature in the first downscaled image;
    identifying a second feature in the second downscaled image; and
    matching the first feature with the second feature.

5. The method of claim 2, wherein determining the first optimal scale level for the first image comprises:
    applying the scale change to the first matching level to generate a scaled matching level of the first image;
    identifying a selected scale level based on a maximum level between the scaled matching level of the first image and the second matching level based on the second motion blur level; and
    applying the selected scale level to the first optimal scale level for the first image.

6. The method of claim 2, wherein determining the second optimal scale level for the second image comprises:
  identifying a selected scale level based on a maximum level between a scaled matching level of the first image and the second matching level based on the second motion blur level; and
  applying the selected scale level to the second optimal scale level for the second image.

7. The method of claim 1, wherein determining the first motion blur level comprises:
  identifying first camera operating parameters of the optical sensor for the first image; and
  determining a first motion of the optical sensor for the first image,
  wherein determining the second motion blur level comprises:
  identifying second camera operating parameters of the optical sensor for the second image; and
  determining a second motion of the optical sensor for the second image.

8. The method of claim 7, wherein determining the first motion of the optical sensor for the first image comprises:
  retrieving first inertial sensor data from an inertial sensor of the visual tracking system for the first image; and
  determining a first angular velocity of the visual tracking system based on the first inertial sensor data,
  wherein the first motion blur level is based on the first camera operating parameters and the first angular velocity of the visual tracking system without analyzing a content of the first image,
  wherein determining the second motion of the optical sensor for the second image comprises:
  retrieving second inertial sensor data from the inertial sensor of the visual tracking system for the second image; and
  determining a second angular velocity of the visual tracking system based on the second inertial sensor data,
  wherein the second motion blur level is based on the second camera operating parameters and the second angular velocity of the visual tracking system without analyzing a content of the second image.

9. The method of claim 7, wherein determining the first motion of the optical sensor for the first image comprises:
  accessing first VIO data from a VIO system of the visual tracking system, the first VIO data comprising a first estimated angular velocity of the optical sensor, a first estimated linear velocity of the optical sensor, and locations of feature points in the first image,
  wherein the first motion blur level is based on the first camera operating parameters and the first VIO data without analyzing a content of the first image,
  wherein the first motion blur level in different areas of the first image is based on the first estimated angular velocity of the optical sensor, the first estimated linear velocity of the optical sensor, and 3D locations of the feature points in corresponding different areas of the first image with respect to the optical sensor,
  wherein determining the first motion of the optical sensor for the first image comprises:
  accessing second VIO data from the VIO system of the visual tracking system, the second VIO data comprising a second estimated angular velocity of the optical sensor, a second estimated linear velocity of the optical sensor, and locations of feature points in the second image,
  wherein the second motion blur level is based on the second camera operating parameters and the second VIO data without analyzing a content of the second image,
  wherein the second motion blur level in different areas of the second image is based on the second estimated angular velocity of the optical sensor, the second estimated linear velocity of the optical sensor, and 3D locations of the feature points in corresponding different areas of the second image with respect to the optical sensor.

10. The method of claim 7, wherein the first camera operating parameters and the second camera operating parameters each comprise a combination of an exposure time of the optical sensor, a field of view of the optical sensor, an ISO value of the optical sensor, and an image resolution,
  wherein the first image comprises a source image, wherein the second image comprises a target image.

11. A computing apparatus comprising:
  one or more processors; and
  a memory storing instructions that, when executed by the one or more processors, configure the apparatus to perform operations comprising:
  accessing a first image and a second image following the first image, the first image and the second image generated by an optical sensor of a visual tracking system;
  determining a first motion blur level of the first image and a second motion blur level of the second image;
  identifying a scale change between the first image and the second image;
  calculating a first matching level based on the first motion blur level, and a second matching level based on the second motion blur level;
  determining a base matching level based on a maximum of the first matching level and the second matching level; and
  adjusting the base matching level based on the scale change.

12. The computing apparatus of claim 11, wherein the operations further comprise:
  determining a first optimal scale level for the first image based on the first motion blur level and the scale change; and
  determining a second optimal scale level for the second image based on the second motion blur level and the scale change.

13. The computing apparatus of claim 12, wherein the operations further comprise:
  downscaling the first image at the first optimal scale level to generate a first downscaled image; and
  downscaling the second image at the first optimal scale level to generate a second downscaled image.

14. The computing apparatus of claim 13, wherein the operations further comprise:
  identifying a first feature in the first downscaled image;
  identifying a second feature in the second downscaled image; and
  matching the first feature with the second feature.

15. The computing apparatus of claim 12, wherein determining the first optimal scale level for the first image comprises:
  applying the scale change to the first matching level to generate a scaled matching level of the first image;
  identifying a selected scale level based on a maximum level between the scaled matching level of the first image and the second matching level based on the second motion blur level; and applying the selected scale level to the first optimal scale level for the first image.

16. The computing apparatus of claim 12, wherein determining the second optimal scale level for the second image comprises:

identifying a selected scale level based on a maximum level between a scaled matching level of the first image and the second matching level based on the second motion blur level; and applying the selected scale level to the second optimal scale level for the second image.

17. The computing apparatus of claim 11, wherein determining the first motion blur level comprises:

identifying first camera operating parameters of the optical sensor for the first image; and determining a first motion of the optical sensor for the first image, wherein determining the second motion blur level comprises:

identifying second camera operating parameters of the optical sensor for the second image; and determining a second motion of the optical sensor for the second image.

18. The computing apparatus of claim 17, wherein determining the first motion of the optical sensor for the first image comprises:

retrieving first inertial sensor data from an inertial sensor of the visual tracking system for the first image; and determining a first angular velocity of the visual tracking system based on the first inertial sensor data, wherein the first motion blur level is based on the first camera operating parameters and the first angular velocity of the visual tracking system without analyzing a content of the first image, wherein determining the second motion of the optical sensor for the second image comprises:

retrieving second inertial sensor data from the inertial sensor of the visual tracking system for the second image; and determining a second angular velocity of the visual tracking system based on the second inertial sensor data, wherein the second motion blur level is based on the second camera operating parameters and the second angular velocity of the visual tracking system without analyzing a content of the second image.

19. The computing apparatus of claim 17, wherein determining the first motion of the optical sensor for the first image comprises:

accessing first VIO data from a VIO system of the visual tracking system, the first VIO data comprising a first estimated angular velocity of the optical sensor, a first estimated linear velocity of the optical sensor, and locations of feature points in the first image, wherein the first motion blur level is based on the first camera operating parameters and the first VIO data without analyzing a content of the first image, wherein the first motion blur level in different areas of the first image is based on the first estimated angular velocity of the optical sensor, the first estimated linear velocity of the optical sensor, and 3D locations of the feature points in corresponding different areas of the first image with respect to the optical sensor, wherein determining the first motion of the optical sensor for the first image comprises:

accessing second VIO data from the VIO system of the visual tracking system, the second VIO data comprising a second estimated angular velocity of the optical sensor, a second estimated linear velocity of the optical sensor, and locations of feature points in the second image, wherein the second motion blur level is based on the second camera operating parameters and the second VIO data without analyzing a content of the second image, wherein the second motion blur level in different areas of the second image is based on the second estimated angular velocity of the optical sensor, the second estimated linear velocity of the optical sensor, and 3D locations of the feature points in corresponding different areas of the second image with respect to the optical sensor.

20. A non-transitory computer-readable storage medium, the computer-readable storage medium including instructions that when executed by a computer, cause the computer to perform operations comprising:

accessing a first image and a second image following the first image, the first image and the second image generated by an optical sensor of a visual tracking system;

determining a first motion blur level of the first image and a second motion blur level of the second image;

identifying a scale change between the first image and the second image;

calculating a first matching level based on the first motion blur level, and a second matching level based on the second motion blur level;

determining a base matching level based on a maximum of the first matching level and the second matching level; and adjusting the base matching level based on the scale change.

* * * * *